US009933009B1

(12) United States Patent
Zaloom

(10) Patent No.: US 9,933,009 B1
(45) Date of Patent: Apr. 3, 2018

(54) COMPACT BIPOSITIONAL LATERAL INTERNAL LOCKING LOAD BEARING ROTATION LOCK MECHANISM

(71) Applicant: Joseph Zaloom, Falls Church, VA (US)

(72) Inventor: Joseph Zaloom, Falls Church, VA (US)

(73) Assignee: JZM Intellectual Holdings, Inc., Falls Church, VA (US)

( * ) Notice: Subject to any disclaimer, the term of this patent is extended or adjusted under 35 U.S.C. 154(b) by 178 days.

(21) Appl. No.: 14/952,595

(22) Filed: Nov. 25, 2015

Related U.S. Application Data

(63) Continuation-in-part of application No. 14/874,713, filed on Oct. 5, 2015, now Pat. No. 9,506,281, which is a continuation-in-part of application No. 14/488,054, filed on Sep. 16, 2014, now Pat. No. 9,483,083, which is a continuation-in-part of application No. 14/255,711, filed on Apr. 17, 2014, now Pat. No. 9,596,914.

(60) Provisional application No. 62/211,085, filed on Aug. 28, 2015, provisional application No. 62/064,216, filed on Oct. 15, 2014, provisional application No. 62/060,353, filed on Oct. 6, 2014, provisional application No. 61/906,878, filed on Nov. 20, 2013, provisional application No. 61/878,491, filed on Sep. 16, 2013, provisional application No. 61/813,893, filed on Apr. 19, 2013.

(51) Int. Cl.
*E05D 11/10* (2006.01)
*F16C 11/10* (2006.01)

(52) U.S. Cl.
CPC .................................. *F16C 11/10* (2013.01)

(58) Field of Classification Search
CPC ...................................................... F16C 11/10
See application file for complete search history.

(56) References Cited

U.S. PATENT DOCUMENTS

| 1,166,702 | A | * | 1/1916 | Mardon et al. ..... E05D 11/1078 |
| | | | | 16/329 |
| 2,101,500 | A | | 12/1937 | Jagus |
| 3,744,085 | A | * | 7/1973 | Griego ................ E05D 11/1007 |
| | | | | 16/325 |
| 4,436,271 | A | | 3/1984 | Manso |
| 5,020,763 | A | | 6/1991 | Hegarty |
| 5,058,848 | A | | 10/1991 | Ferraro |
| 5,060,904 | A | | 10/1991 | Hegarty |

(Continued)

OTHER PUBLICATIONS

"Computer Components & Imaging Supplies", Crimson Imaging Supplies, Mar. 15, 2013, two pages.

(Continued)

*Primary Examiner* — Victor D Batson
*Assistant Examiner* — Matthew J Sullivan
(74) *Attorney, Agent, or Firm* — Nixon & Vanderhye, P.C.

(57) ABSTRACT

A releasable locking hinge assembly having: a shaft including a first locking region with faceted sides on an outer circumference of the shaft, and a partial or complete hollow cylinder coaxial with and receiving the shaft, wherein the hollow cylinder includes a second locking region with faceted sides on an inner wall of the cylinder, wherein the first locking region and second locking region are configured to slidably engage; and wherein the locking regions slidably engage, they lock the angular position of the locking hinge, and where they slidably disengage, they allow the locking hinge to pivot.

20 Claims, 26 Drawing Sheets

(56) References Cited

U.S. PATENT DOCUMENTS

| | | | |
|---|---|---|---|
| 5,074,164 | A | 12/1991 | Sheu |
| 5,100,098 | A | 3/1992 | Hawkins |
| 5,168,601 | A | 12/1992 | Liu |
| 5,933,996 | A | 8/1999 | Chang |
| 6,367,760 | B1 | 4/2002 | Pagano |
| 6,983,514 | B2 | 1/2006 | Lu et al. |
| 7,083,155 | B1 | 8/2006 | Smartt |
| 7,188,818 | B2 | 3/2007 | Chang |
| 7,546,996 | B2 | 6/2009 | Somji |
| 7,568,915 | B1 | 8/2009 | Lavoie |
| 7,581,290 | B2 | 9/2009 | Chang |
| 7,591,604 | B2 | 9/2009 | Roberts |
| 7,611,117 | B1 | 11/2009 | Lang, Jr. |
| 7,712,719 | B2 | 5/2010 | Derry et al. |
| 7,770,862 | B2 | 8/2010 | Chen |
| 7,836,623 | B2 | 11/2010 | Wang et al. |
| 8,038,116 | B2 | 10/2011 | Lee et al. |
| 8,118,274 | B2 | 2/2012 | McClure et al. |
| D672,783 | S | 12/2012 | Robinson |
| 8,382,059 | B2 | 2/2013 | LeGette et al. |
| 8,387,930 | B2 | 3/2013 | Drew et al. |
| 8,833,716 | B2 | 9/2014 | Funk et al. |
| 9,273,503 | B2* | 3/2016 | Van Gennep ....... E05D 11/1007 |
| 9,470,356 | B1* | 10/2016 | Zaloom ................ F16M 11/12 |
| 9,483,083 | B1* | 11/2016 | Zaloom ................ G06F 1/1679 |
| 9,506,281 | B1* | 11/2016 | Zaloom ............... E05D 11/1028 |
| 9,596,914 | B2* | 3/2017 | Zaloom ................ G06F 1/1626 |
| 2004/0007649 | A1 | 1/2004 | Vettraino |
| 2005/0155183 | A1 | 7/2005 | Lu et al. |
| 2006/0084585 | A1 | 4/2006 | Lin |
| 2006/0137491 | A1* | 6/2006 | Chen ..................... B25B 13/461 |
| | | | 81/58 |
| 2006/0175484 | A1 | 8/2006 | Wood, III et al. |
| 2008/0109993 | A1* | 5/2008 | Myeong ................ G06F 1/1679 |
| | | | 16/277 |
| 2008/0156836 | A1 | 7/2008 | Wadsworth et al. |
| 2011/0094058 | A1* | 4/2011 | Van Gennep ....... E05D 11/1007 |
| | | | 16/327 |
| 2011/0102752 | A1* | 5/2011 | Chen ..................... F16M 11/10 |
| | | | 353/119 |
| 2012/0074272 | A1 | 3/2012 | Hull |
| 2012/0111881 | A1 | 5/2012 | Gaddis, II et al. |
| 2012/0126088 | A1 | 5/2012 | Whittaker et al. |
| 2012/0326003 | A1 | 12/2012 | Solow et al. |
| 2013/0092805 | A1 | 4/2013 | Funk et al. |
| 2013/0092811 | A1 | 4/2013 | Funk et al. |
| 2013/0233984 | A1 | 9/2013 | Huang |
| 2013/0256478 | A1 | 10/2013 | Reda et al. |
| 2013/0277520 | A1 | 10/2013 | Funk et al. |
| 2014/0054426 | A1 | 2/2014 | Burns |
| 2014/0063750 | A1 | 3/2014 | Mau et al. |
| 2014/0116230 | A1 | 5/2014 | Nakata et al. |
| 2014/0259532 | A1* | 9/2014 | Millard ............... E05D 11/1028 |
| | | | 16/326 |
| 2014/0328020 | A1 | 11/2014 | Galant |
| 2014/0346311 | A1 | 11/2014 | Derman |

OTHER PUBLICATIONS

"Ipad/Tablet Holding Products—Galaxy Tab Stand, Ipad Leg Strap, Nook Holder @ Hand e Holder", www.handholder.com, Mar. 15, 2013, four pages.
"HandyShell for iPad, iPad Cases & Covers/SpeckProducts", Mar. 15, 2013, two pages.
Detachable Metal Stand for iPad, Cell Phone, Smartphone, Tablet Accessories/iKross, Mar. 15, 2013, two pages.
"Life-Phorm All-in-One Positioning Device for iPad 3, iPad 4, Tablets, Smartphones and Cameras (000LIF)", Amazon.com: Life-Phorm All-in-One Positioning Device for iPad 3, iPad 4, Tablets, Smartphones and Cameras (000LiF): Computers & Accessories, Apr. 18, 2013, four pages.
"Stabile Coil PRO—Flexible Gooseneck Coil Based Pivoting iPad Stand—iPad 4g, 3g, iPad 2 and 1g", Stabile Coil PRO Flexible Gooseneck Coil Pivoting iPad 4g, 3g, iPad 2 and iPad Stand Holder, Apr. 18, 2013, four pages.
"Buzz / ZeroChromaZeroChroma", Mar. 15, 2013, twelve pages.

* cited by examiner

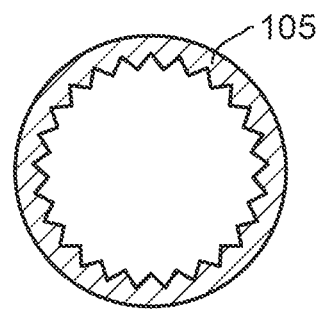 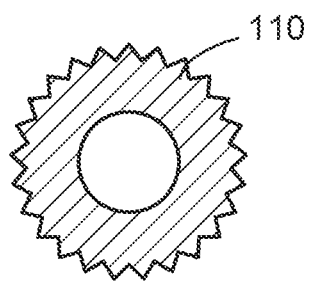
FIG. 1A　　FIG. 1B
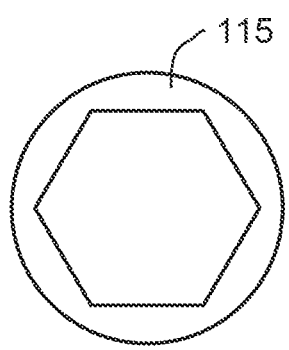 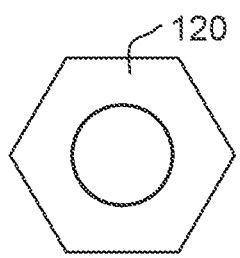
FIG. 2A　　FIG. 2B

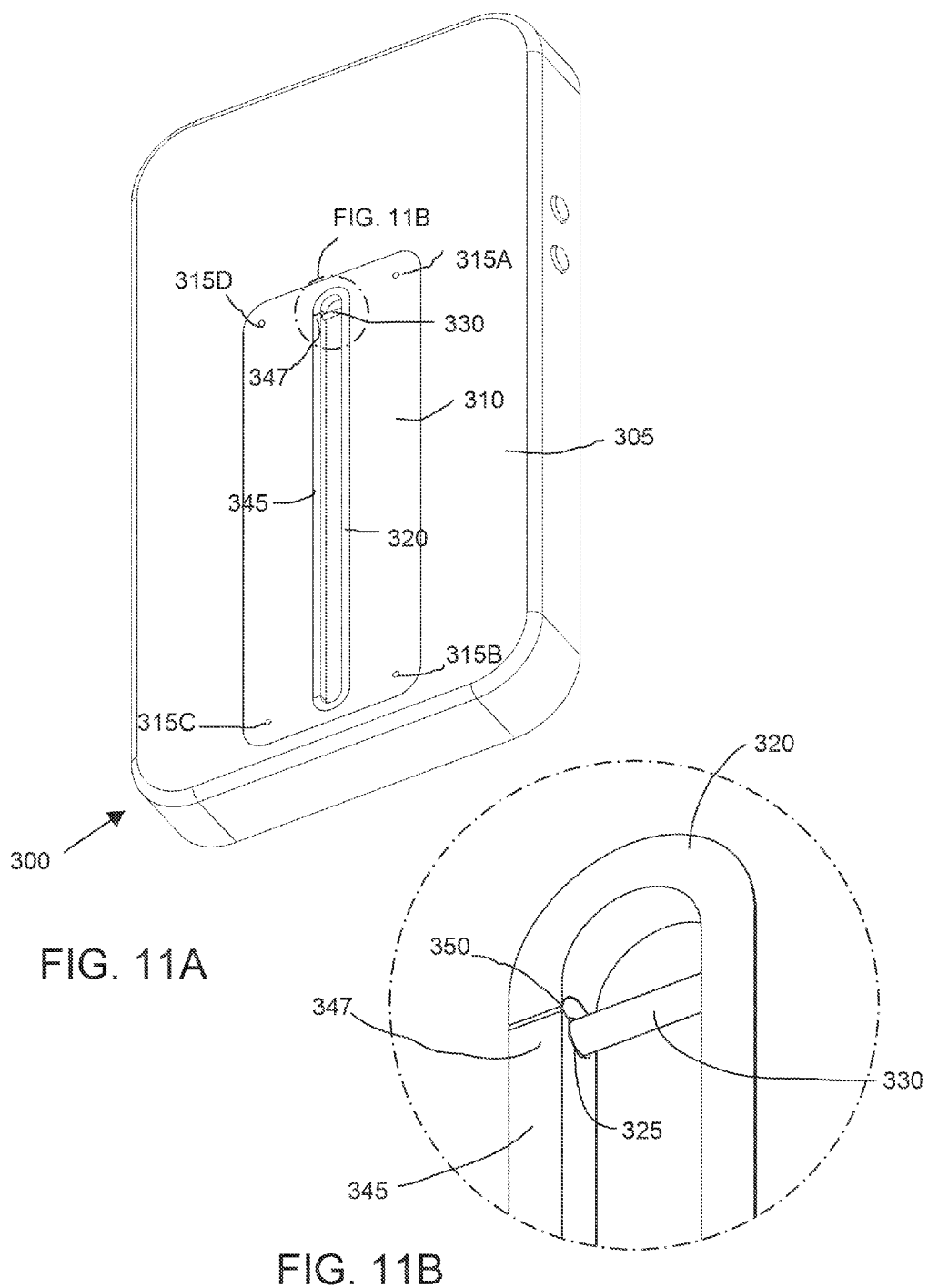

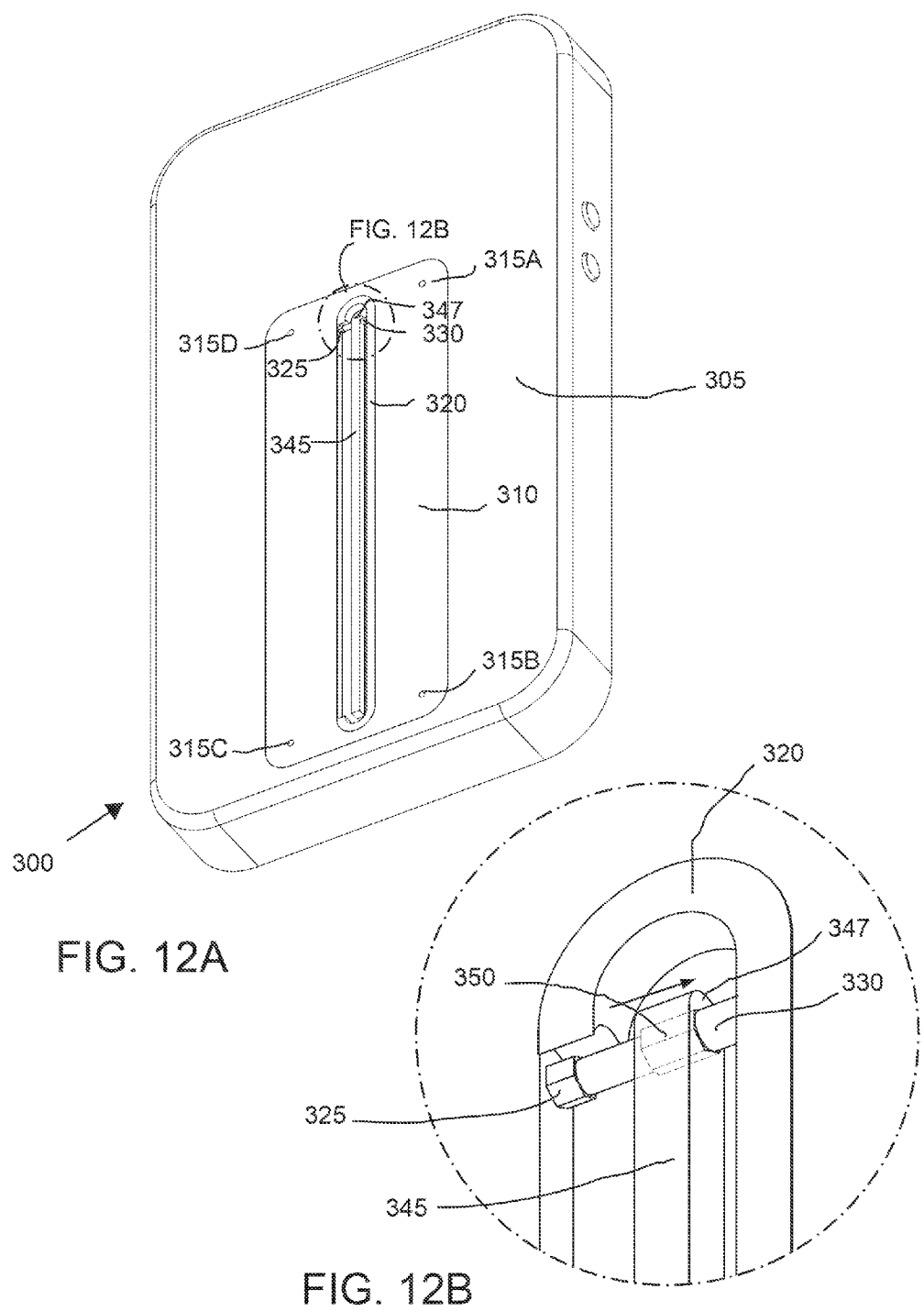

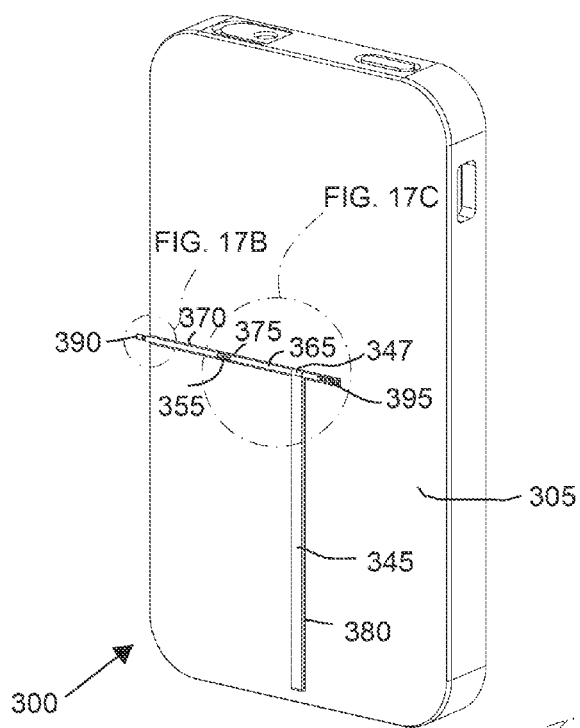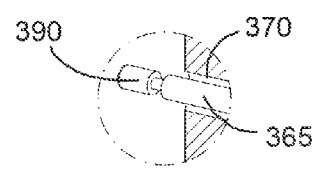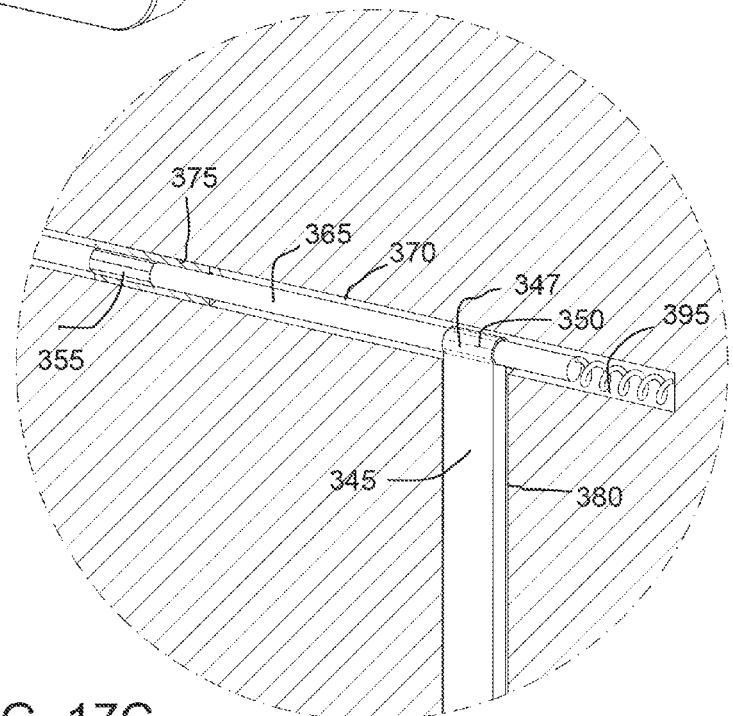
FIG. 17A
FIG. 17B
FIG. 17C

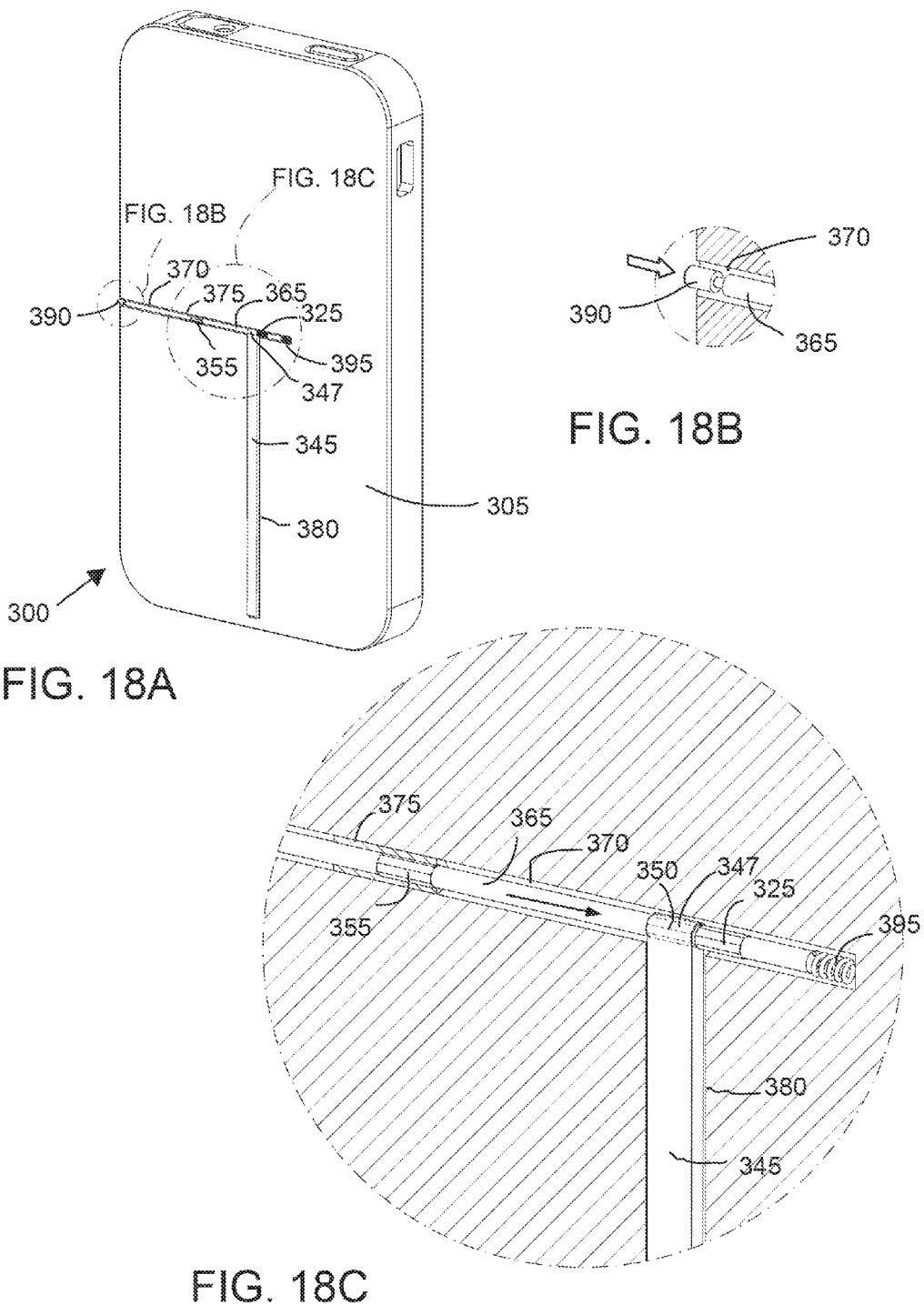

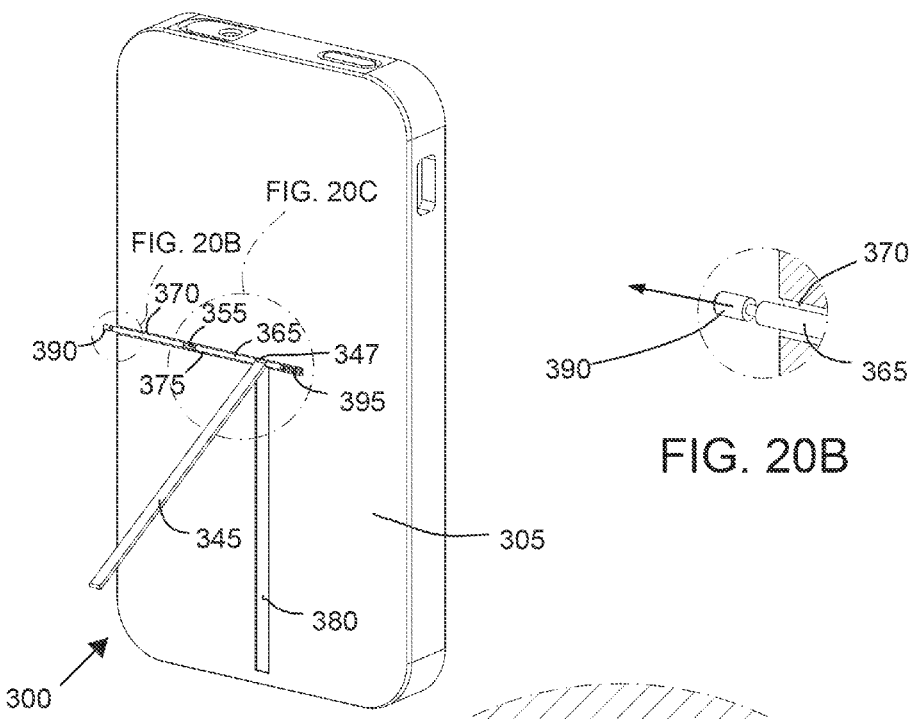
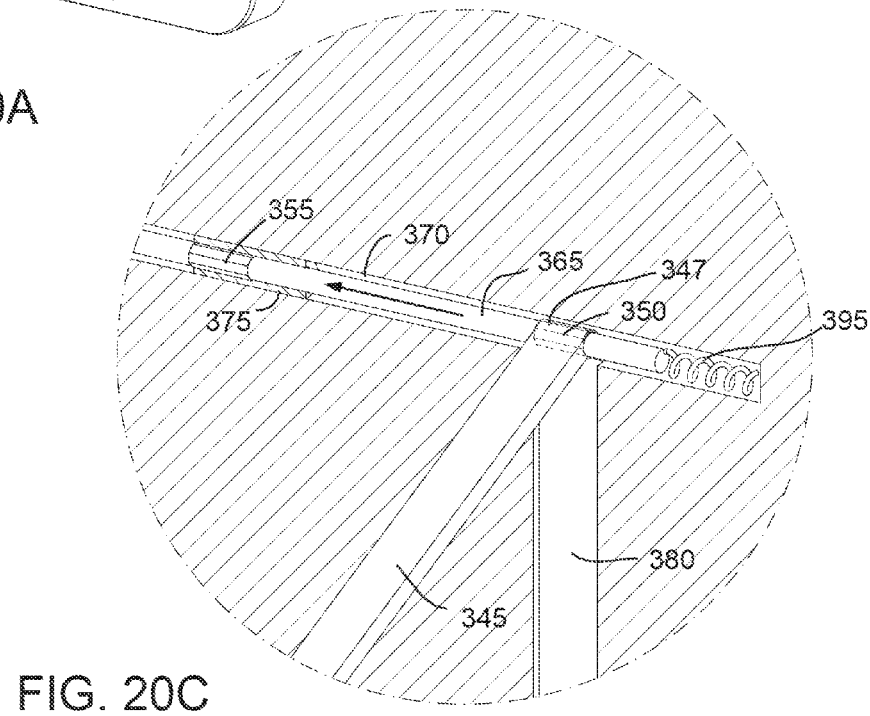

COMPACT BIPOSITIONAL LATERAL INTERNAL LOCKING LOAD BEARING ROTATION LOCK MECHANISM

RELATED APPLICATIONS

This application is continuation-in-parts (CIPs) of U.S. patent application Ser. No. 14/874,713, filed Oct. 5, 2015, U.S. patent application Ser. No. 14/488,054, filed Sep. 16, 2014, and U.S. patent application Ser. No. 14/255,711, filed Apr. 17, 2014, and claims the benefit of U.S. Provisional Application 62/064,216 filed Oct. 15, 2014, and U.S. Provisional Application 62/060,353 filed Oct. 6, 2014, and U.S. Provisional Application 61/906,878 filed Nov. 20, 2013, and U.S. Provisional Application 61/878,491 filed Sep. 16, 2013, all of which applications are incorporated by reference in their entireties.

FIELD OF INVENTION

This technology relates to simple and compact mechanisms for locking and unlocking the rotation of load bearing hinges at multiple specific angles. More particularly, the technology herein relates to the specific angular positioning of personal information display and input devices among other applications.

BACKGROUND OF THE INVENTION

Since the introduction of the Apple iPhone in June 2007, the number of computing devices known as smart phones has vastly increased. These devices typically consist of a touch screen that fronts a highly sophisticated, versatile, thin, and lightweight computer that among other things, serves as a point-and-shoot camera, a video camera, and a face-to-face wireless communications device. Some of the latest popular incarnations of these devices are the iPhone 6s and 6s Plus and the Samsung Galaxy S6 and S6 edge, with thicknesses in the neighborhood of 7 mm.

While such devices represent marvels of modern communication, voice recording, photography, videography, gaming and the consumption and documentation of information and entertainment; they all share a major deficiency that limits their usability; the ability to be positioned to various angles and orientations with respect to a base (a resting surface) in order eliminate glare, steady a camera shot, position the video camera at an optimum angle for recording a scene, for communicating wirelessly with another person over an extended period of time without tiring one's hand, as well as for consuming information or entertainment while freeing both hands to eat, or to perform other tasks concurrently.

A multitude of offerings from several manufacturers of smart phone cases reveals that the great majority of current smart phone cases do not include a stand, and of the relatively small number of manufacturers that do include a stand, most include stands that can only provide for one or two viewing angles (with respect to a resting surface or base.)

One company that currently offers smart phone cases with stands that can be positioned to various angles and orientations with respect to a base is ZeroChroma, LLC (www.zerochroma.com) through their "VarioProtect", "VarioEdge", and "Vortex" cell phone cases. The ZeroChroma designs use a series of flexible "bumps" that are transverse to the axis of rotation of the pivoting support element or stand to fix the rotation of the stand. While the ZeroChroma, LLC designs provide multiple viewing angles that can effectively eliminate glare and provide an ergonomic viewing experience, their designs are relatively complex, add substantial weight and thickness to a smart phone, and require a relatively strong force to unlock and deploy the pivoting support element or stand.

Therefore a need exists for a simple and compact technology that not only can support a relatively large number of adjustable viewing angles for a smart phone, but that can do so with minimum additional weight, thickness, effort, and cost, that it may become a ubiquitous appendage to most smart phones in the future.

SUMMARY OF THE INVENTION

I have invented and disclose herein a novel releasable locking assembly including a shaft having a first locking region with faceted sides on an outer circumference of the shaft, and a partial or complete hollow cylinder coaxial with and receiving the shaft, wherein the hollow cylinder includes a second locking region with faceted sides on an inner wall of the cylinder, wherein the first locking region and second locking region are configured to slidably engage; and wherein the locking regions slidably engage, they lock the angular position of the locking hinge, and where they slidably disengage, they allow the locking hinge to pivot.

The releasable locking assembly may include cylindrical shaft and the snugly enveloping tube or hollow cylinder, where the enveloping tube or hollow cylinder is attached to a pivoting support element and the cylindrical shaft is attached to a fixed surface area, and where the surface of the cavity (the inner surface) of the tube or hollow cylinder that is attached to the pivoting element incorporates at least one multi-sided or toothed locking area that is configured to radially mesh and interlock with a matching multi-sided or toothed locking region on the cylindrical shaft around which it rotates and wherein the locking region on the shaft engages the locking area of the tube the pivoting support element that is attached to the tube is restricted from pivoting, and wherein the locking region on the shaft becomes disengaged from the locking area of the tube or hollow cylinder either by sliding the tube or hollow cylinder laterally over the stationary shaft, or by thrusting the shaft through a laterally stationary tube or hollow cylinder, the pivoting support element that is attached to the tube or hollow cylinder becomes free to pivot and rotate around the cylindrical shaft.

Another embodiment of the invention is a load bearing rotation lock mechanism that revolves around a pivoting element located on or within a surface, wherein the element is movable between a retracted position and at least two extended positions relative to the surface. The element being disposed in the flush position against or within the surface in its retracted position and extending from the surface to provide orientation and support in its extended positions, and wherein the pivoting element is traversed by a tube or hollow cylinder that rotates snugly around a partial or complete cylindrical shaft that is attached to a fixed surface area and that includes at least one multi-sided or toothed locking region.

The surface of the cavity of the tube or hollow cylinder that is attached to the pivoting element (the inner surface of the tube or hollow cylinder) incorporates at least one multi-sided or toothed locking area that is configured to radially mesh and interlock with a multi-sided or toothed locking region of the cylindrical shaft around which it rotates.

When the multi-sided or toothed locking area of the cavity of the tube or hollow cylinder that is attached to the pivoting element comes in contact with at least one multi-sided or toothed locking region on the outer surface of the cylindrical shaft that is attached to a fixed surface area, the meshing areas interlock and the tube or hollow cylinder and the pivoting element to which it is attached can no longer pivot around the cylindrical shaft that is attached to the fixed surface area.

When the cylindrical shaft that is attached to the fixed surface area and that is enclosed by the tube or hollow cylinder is made to be rotationally fixed and the tube or hollow cylinder that is attached to a pivoting element is thrust in a direction that aligns its multi-sided or toothed locking area with a multi-sided or toothed locking region that is located on the cylindrical shaft that is attached to the fixed surface area, the tube or hollow cylinder interlocks with the rotationally fixed cylindrical shaft and the support element that is attached to the tube or hollow cylinder is prevented from pivoting and is fixed in its rotational angular position with respect to the interlocking cylindrical shaft.

When the tube or hollow cylinder that is attached to a pivoting element is thrust in a direction that results in the complete disengagement of the radially locking multi-sided or toothed area that is on the inner surface of the tube or hollow cylinder and a multi-sided or toothed locking region that is located on the cylindrical shaft that is attached to a fixed surface area, the tube or hollow cylinder and its attached support element become free to pivot and rotate to a new angular position around the cylindrical shaft.

Alternatively, the same effect can be achieved if the tube or hollow cylinder that is attached to the support element is constricted from moving in a lateral direction, and the rotationally fixed cylindrical shaft that is attached to a fixed surface is thrust in a lateral direction that would result in either the engagement or the total disengagement of the matching multi-sided or toothed locking areas that are located on the inner surface of the tube or hollow cylinder and the outer surface of the cylindrical shaft that is attached to a fixed surface area.

While the rotation lock mechanism for load bearing hinges disclosed herein has been embodied in designs that enhance the functionality, ergonomic, and enjoyment of smart phones, it may also be of use in propping up other types of electronic display panels, such as electronic tablets, computer monitors, and even conventional picture frames, with possible applications in robotics; as robots are essentially a combination of mechanical parts connected primarily with hinges. Further, the rotation lock mechanism is not limited to these applications and may be used for other applications.

BRIEF DESCRIPTION OF THE DRAWINGS

These and other features and advantages will be better and more completely understood by referring to the following description of exemplary non-limiting illustrative embodiments in conjunction with the drawings of which:

FIGS. 1A and 1B show in cross section an internal chamber (FIG. 1A) to house a disk with teeth (FIG. 1B).

FIGS. 2A and 2B show another example of an internal chamber (FIG. 2A) to house a disc with teeth (FIG. 2B).

FIGS. 11A to 14A and FIGS. 11B to 14B together are a sequence of drawings that when displayed one after another provide a flip chart animation showing how an tube or hollow cylinder attached to a support element can be slid across a horizontal cylindrical shaft with a multi-sided locking region located at one edge of the cylindrical shaft to unlock, rotate, and relock a support element positioned in the middle of the back surface of a smart phone in order to provide robust angular support for the smart phone at multiple inclined positions.

FIGS. 17A to 20A and FIGS. 17B to 20B and FIGS. 17C to 20C together are a sequence of drawings that when displayed one after another provide a flip chart animation showing how an rotationally fixed cylindrical shaft that is positioned in a tube or hollow cylinder which is attached to the back panel of a smart phone or smart phone cover can be thrust laterally across the tube or hollow cylinder to unlock, rotate, and relock a transverse pivoting support element which can be used to provide stable angular support for the smart phone at multiple inclined positions.

DETAILED DESCRIPTION

Figure 3A:
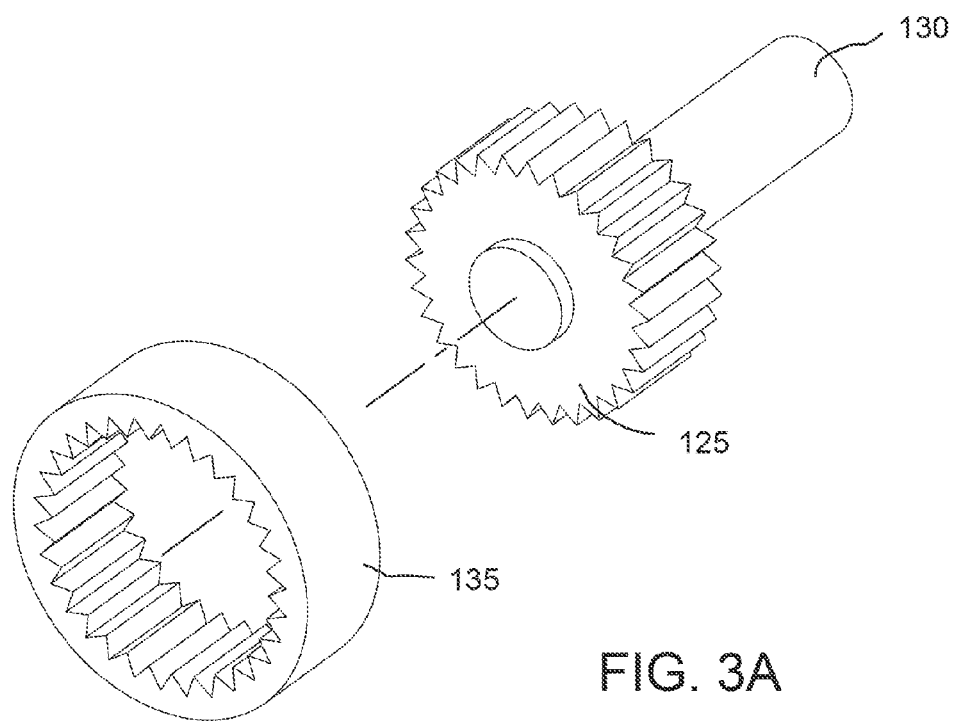
FIG. 3A illustrates a three-dimensional perspective view representation of how the outer surface of a disk with teeth, or cylinder, mounted on a cylindrical shaft can interlock with the inner surface of an enveloping tube or cylinder.

Disclosed herein are embodiments of a load bearing rotation lock mechanism including a cylindrical shaft and a snugly enveloping tube or hollow cylinder where the enveloping tube or hollow cylinder is attached to a pivoting support element and the cylindrical shaft is attached to a fixed surface area, and where the surface of the cavity (the inner surface) of the tube or hollow cylinder that is attached to the pivoting element incorporates at least one multi-sided or toothed locking area that is configured to radially mesh and interlock with a matching multi-sided or toothed locking region on the cylindrical shaft around which it rotates and wherein the locking region on the shaft engages the locking area of the tube the pivoting support element that is attached to the tube is restricted from pivoting, and wherein the locking region on the shaft becomes disengaged from the locking area of the tube or hollow cylinder either by sliding the tube or hollow cylinder laterally over the stationary shaft, or by thrusting the shaft through a laterally stationary tube or hollow cylinder, the pivoting support element that is attached to the tube or hollow cylinder becomes free to pivot and rotate around the cylindrical shaft.

FIG. 1A represents a cross-sectional embodiment of an internal gear 105, and FIG. 1B represents a cross-sectional embodiment of a spur gear 110. Generally speaking, spur gears or straight-cut gears are a simple type of gear consisting of a cylinder or disk with the teeth projecting radially, where the edge of each tooth is straight and aligned parallel to the axis of rotation. These gears can be meshed together correctly if they are fitted to a common axis. These illustrations are used to illuminate a cylindrical shaft and an enveloping hollow cylinder that are fitted to a common axis and that can be meshed (locked) together radially in certain regions of their inner and outer surface areas and where the shaft is attached to a fixed surface area and the enveloping cylinder is attached to a pivoting arm or other kind of pivoting support element, and where a locking region (or regions) on the shaft meshes (locks) with a corresponding locking area (or areas) of the enveloping cylinder the pivoting support element that is attached to the cylinder is locked and restricted from pivoting around the shaft, and where the locking region (or regions) on the cylindrical shaft becomes unmeshed (unlocked) from the locking area (or areas) of the cylinder, either by sliding the cylinder laterally over a stationary shaft, or by thrusting the shaft laterally through a stationary cylinder, the pivoting support element that is attached to the cylinder becomes free to pivot and rotate around the shaft.

FIG. 2A represents a cross-sectional embodiment of a hex socket 115, and FIG. 2B represents a cross-sectional embodiment of a hex key 120. The hex key 120 can be meshed together correctly with a similarly sized hex socket 115 if they are fitted to a common axis. These illustrations are used to highlight the fact that angular meshing of cylindrical shafts and cylinders can be achieved through various means, such as the interlocking of radially connected concentric segments as can be achieved by the interlocking of hex keys and sockets or the interlocking of spur gears and internal gears.

The hex key 120 has faceted sides that are configured to match the faceted sides the hex socket 115. As shown in FIG. 2A, the faceted sides are planar surfaces on the outer circumference of the hex key. The planar surfaces are each parallel to a rotational axis of the hex key 120. The surfaces are shown in a symmetrical annular array around the axis. The surfaces of the faceted sides may be curved or curvilinear. The number of faceted surfaces is related to the number of angular orientations between the hex key 120 and the hex socket 115. In the example shown in FIGS. 2A and 2B, the hex key may be oriented at six angular positions when fitted into the hex socket. The six angular positions correspond to the six faceted sides on the hex key 120. Thus, in the example shown in FIGS. 2A and 2B there is a one to one correspondence between the number of faceted sides on the hex key and the angular positions at which the hex key can be positioned with respect to the hex socket.

FIG. 3A is a three-dimensional perspective view of an exploded view representation of a non-limiting example of a spur gear 125 connected to a rotating cylindrical shaft 130 can mesh with a fixed or stationary internal gear 135 to lock the angular position of the rotating shaft.

Figure 3B:
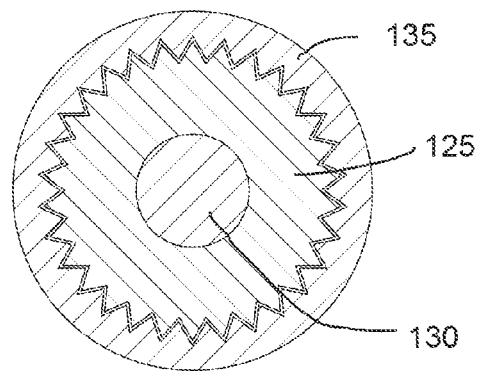
FIG. 3B illustrates a cross-sectional two-dimensional representation of how a disk with teeth, or cylinder, mounted on a cylindrical shaft can mesh with the inner surface of an enveloping tube or cylinder to fix the angular/rotational position of the shaft.

FIG. 3B illustrates a cross-sectional two-dimensional representation of how a non-limiting example of a spur gear 125 connected to a cylindrical shaft 130 can mesh with an internal gear 135 to fix the angular/rotational position of the shaft. The spur gear may be oriented at one of many angular orientations when meshed with the gears in the cylindrical shaft. The angular orientations allow the spur gear to be locked in one angular orientation when meshed with the gears in the cylindrical shaft, and turned to another angular orientation by sliding the spur gear out of the gears in the cylindrical shaft, turning the spur gear and inserting the spur gear into engagement with the gears in the cylindrical shaft.

Figure 4A:
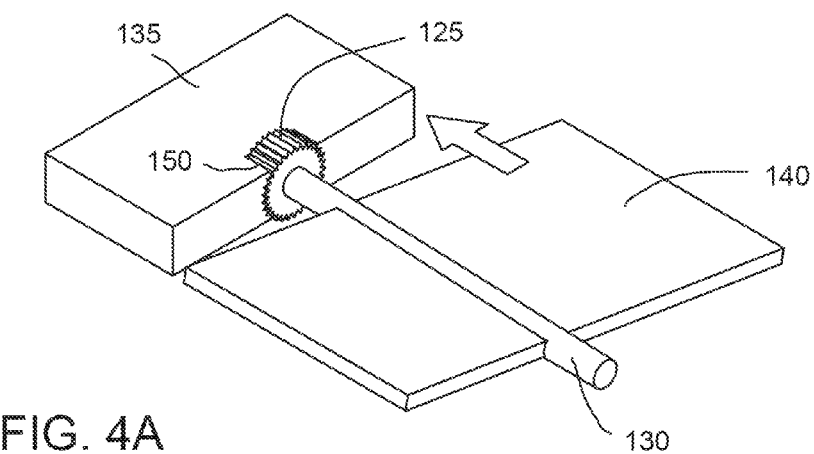
FIG. 4A illustrates an example of how the rotational position of an plate, or support element, attached to cylindrical shaft that is fastened to an disk or cylinder with teeth (spur gear) can be locked when inserted into a partial internal gear imbedded in the side wall extending between the front surface and the rear surface of a fixed plate.

FIG. 4A illustrates an example of how the rotational position of a plate, or support element, 140 attached to cylindrical shaft 130 that is fastened to disk or cylinder with teeth 125 can be locked when inserted into a partial internal gear 150 imbedded in the side wall extending between the front surface and the rear surface of a fixed plate 135. The rotational position of the plate 140 is locked with respect to the fixed plate 135 because of the engagement between the teeth 125 of the disk and the teeth of the internal gear 150.

Figure 4B:
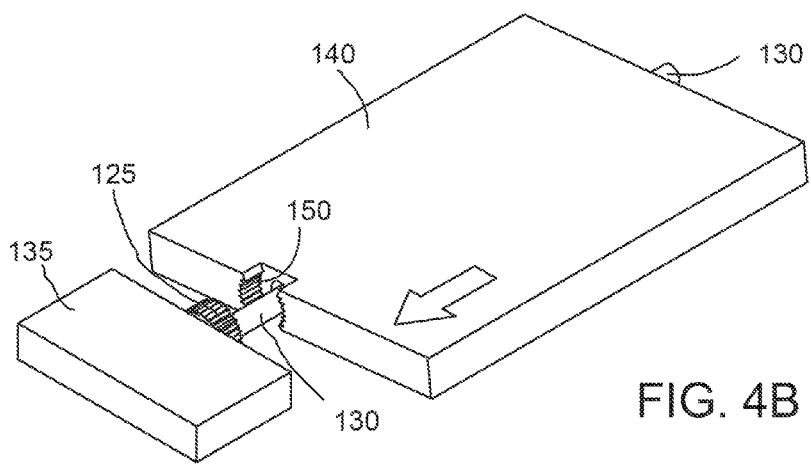
FIG. 4B illustrates a three-dimensional perspective view showing how interchanging the location of the gears of FIG. 4A by fixing the position of the disk or cylinder with teeth (spur gear) while making the internal gear rotatable will have the same locking and unlocking effect on the rotatable plate, or support element that is illustrated in FIG. 4A.

FIG. 4B illustrates a perspective view showing how interchanging the location of the gears of FIG. 4A by fixing the position of the disk or cylinder with teeth 125 while making the internal gear 150 rotatable will have the same locking and unlocking effect on the rotatable plate, or support element 140 that is illustrated in FIG. 4A. In particular, by sliding the partial internal gear 150 out of the disk with teeth 125, the plate 140 may rotate with respect to the fixed plate 135. FIGS. 4A and 4B illustrate a rotation locking mechanism that may be used as a locking and pivoting support element for a holder of a computer tablet.

Figure 5A:
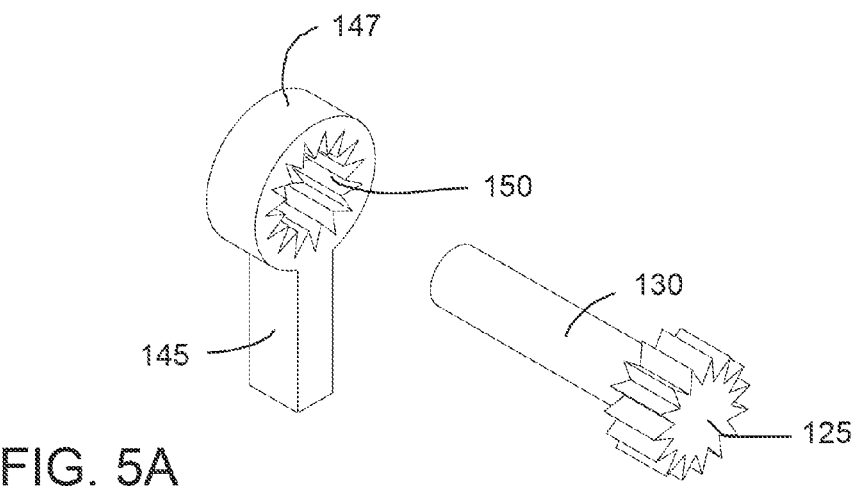
FIG. 5A illustrates a three dimensional perspective view of how a pivoting element attached to a tube or hollow cylinder that incorporates a toothed cavity can interlock with a matching toothed region located at an edge of the outer surface area of a matching cylindrical shaft.
Figure 5B:
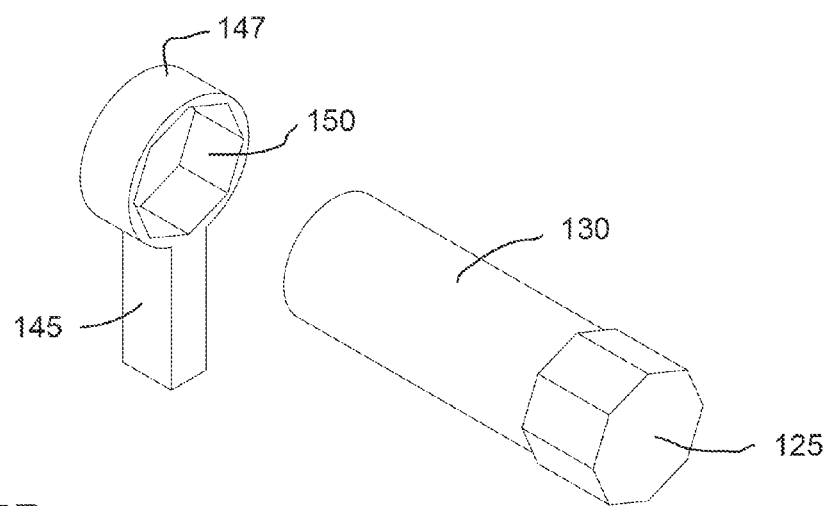
FIG. 5B illustrates a three dimensional perspective view of how a pivoting element attached to a tube or hollow cylinder that incorporate a multi-sided cavity can interlock with a matching multi-sided region located at an edge of the outer surface area of a matching cylindrical shaft.

FIG. 5A illustrates a perspective view of how a pivoting element 145 attached to a tube or hollow cylinder 147 that incorporates a toothed cavity 150 can interlock with a matching toothed region 125 located at an edge of the outer surface area of a matching cylindrical shaft 130. FIG. 5B illustrates a perspective view of how a pivoting element 145 attached to a tube or hollow cylinder 147 that incorporate a multi-sided cavity 150 can interlock with a matching multi-sided region 125 located at an edge of the outer surface area of a matching cylindrical shaft 130.

The embodiments shown in FIGS. 5A and 4B have structures, e.g., gear teeth and faceted sides, similar to the embodiments shown in FIGS. 4A and 4B. The embodiments in FIGS. 5A and 5B show a pivoting element that locks in any of several discrete angular positions. The locking of the rotation of the pivoting element is achieved within the pivoting element itself rather than at a side wall that is adjacent to one edge of the pivoting element (as in FIG. 4A)

FIGS. 6A to 6E show in a sequence of illustrations how the rotational position of a pivoting support element 145 attached to a tube or hollow cylinder 147 that incorporates a multi-sided cavity 150 can be locked, unlocked, rotated, and relocked when thrust and retracted from a matching multi-sided region 125 on the outer surface area of a matching cylindrical shaft 130.

Figure 6A:
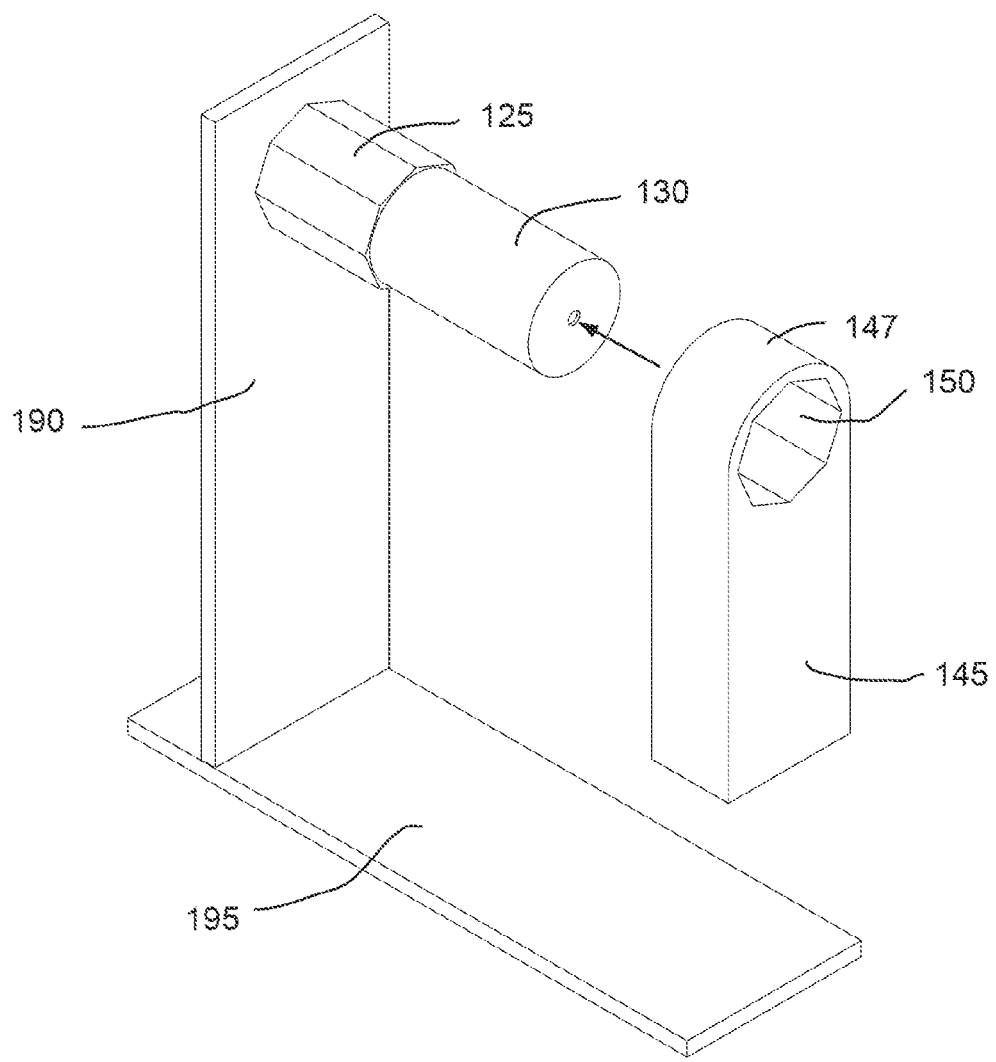
FIGS. 6A to 6E show an example flip chart animation of how the rotational position of a pivoting support element attached to a tube or hollow cylinder that incorporates a multi-sided cavity can be locked, unlocked, rotated, and relocked when thrust and retracted from a matching multi-sided region on the outer surface area of a matching cylindrical shaft.

FIG. 6A illustrates the initial, disengaged, position of the support element 145 that is attached to a device including a tube or hollow cylinder 147 before it becomes engaged to the cylindrical shaft 130. The support element 145 may be a leg, plate or other device that provides a support for a device 190 in need of support. The device 190 may be a smart telephone, tablet computer, electronic book, or other device that may stand on its lower edge 195. The device 190 may be unstable when on its edge 195, especially if the device is positioned at an angle to provide better view of the device. The support element 145 provides a leg attachable to the device 190 and that can be positioned to have a lower end seated on the same surface that supports the lower edge 195 of the device.

As shown in FIG. 6A, the support element 145 is disengaged with the device 190 and particularly with the shaft 130 of the device. In this configuration, the support element does not support the device 190 and may be housed in a recess in the back of the device or separated from the device. It should be noted that the support element 145 is free to pivot or otherwise move with respect to the device 190 while in the arrangement shown in FIG. 6A.

Figure 6B:
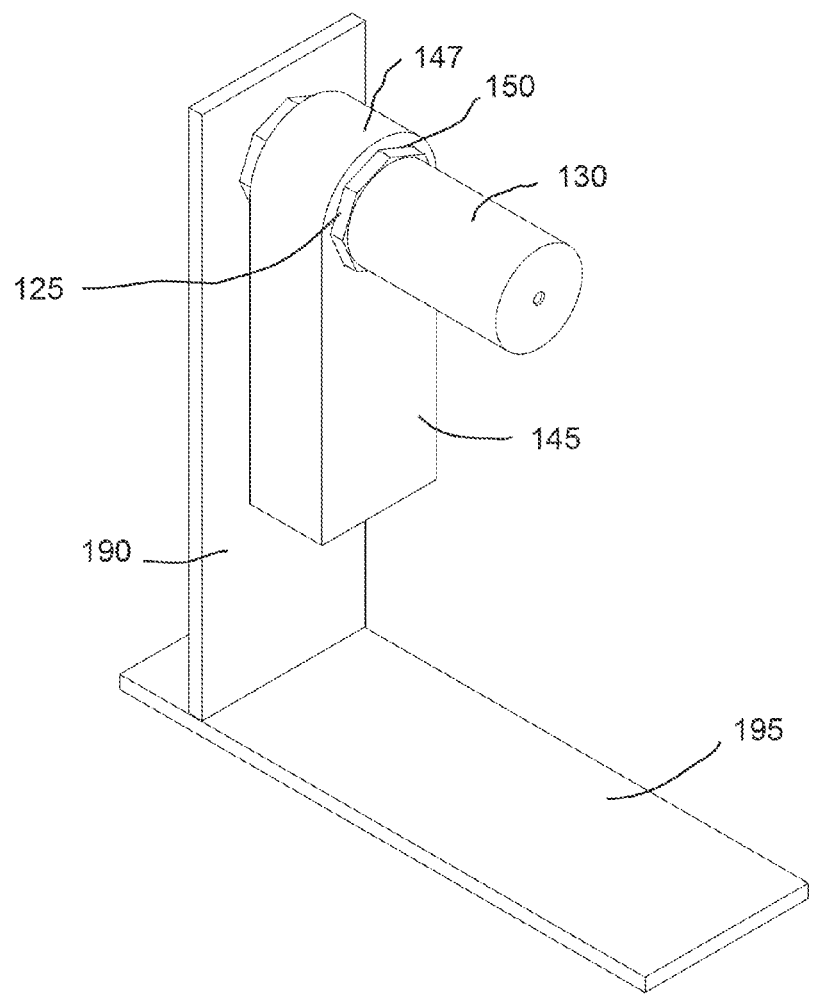

FIG. 6B illustrates the pivoting support element 145 attached to the tube or hollow cylinder 147 in an initial locked position. The locking is achieved because the multi-sided, e.g., faceted, cavity 150 of the cylinder 147 of the support element 145 is meshed (locked) with a portion of the cylindrical shaft 130 having multi-sides, e.g., facets, that are configured to mesh with the multi-sides of the support element. In the configuration shown in FIG. 6B, the support element is radially aligned with the lower edge 195, which would occur if the support element is stowed in a cavity or recess of the device 190.

Figure 6C:
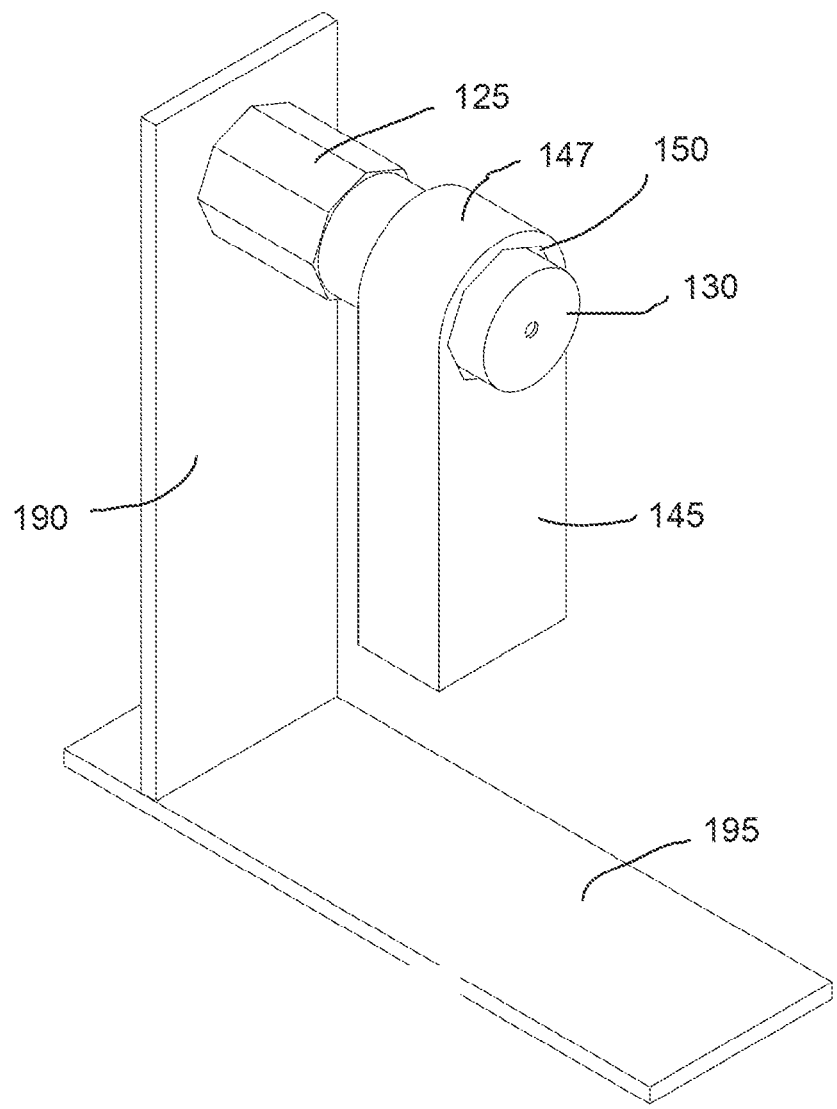

FIG. 6C illustrates the pivoting support element 145 that is attached to a tube or hollow cylinder 147 having moved to an unlocked position with its multi-sided cavity 150 disengaged (unlocked) from locking region 125 of cylindrical shaft 130. The cylinder 147 remains on the shaft 130 and thus the support element 145 is constrained to pivot about the shaft and slide axially along the shaft.

Figure 6D:
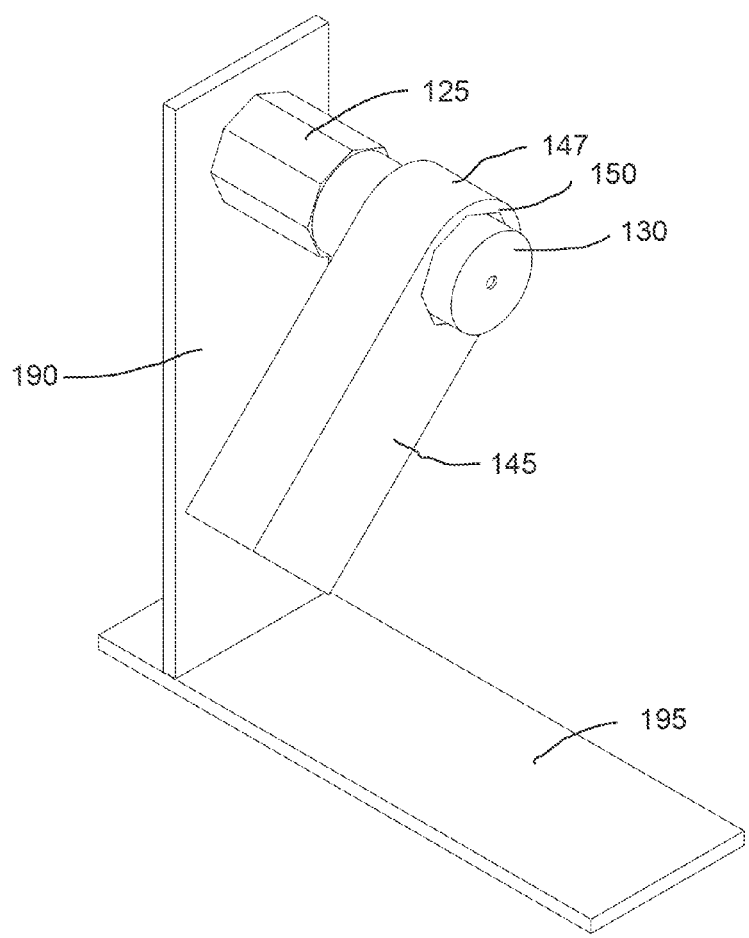
Figure 6E:
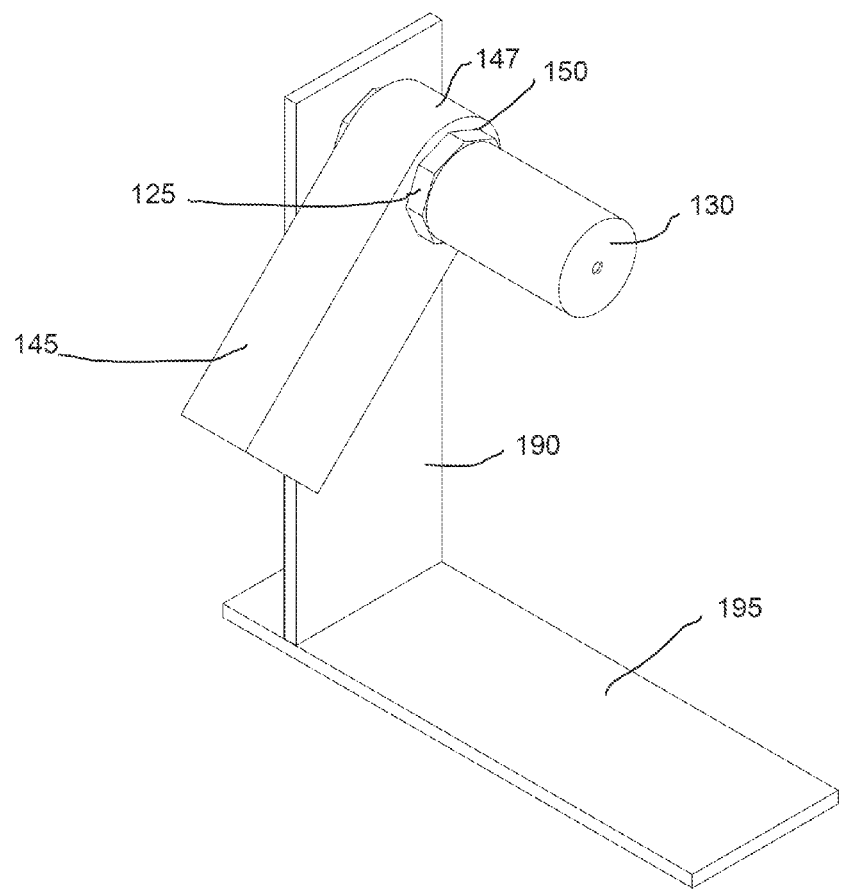

FIG. 6D illustrates the pivoting support element 145 that is attached to a tube or hollow cylinder 147 pivoted to a new angular position while its multi-sided cavity 150 continues to be disengaged (unlocked) from locking region 125 of cylindrical shaft 130. For example, the support element is pivoted to a desired angular position to support the device as it sits on its edge 195. As shown in FIG. 6E, when the desired angular position is achieved, the support element 145 is slid axially along the shaft until the multi-faceted sides of the cylinder 147 engage the multi-faceted sides of the locking region 125 on the shaft 130. FIG. 6E illustrates the newly fixed angular position of the pivoting support element 145 that is attached to a tube or hollow cylinder 147 after having slid back into the locked position subsequent to having pivoted to a new angular position while its multi-sided cavity 150 was fully disengaged from locking region 125 of cylindrical shaft 130.

Figure 7:
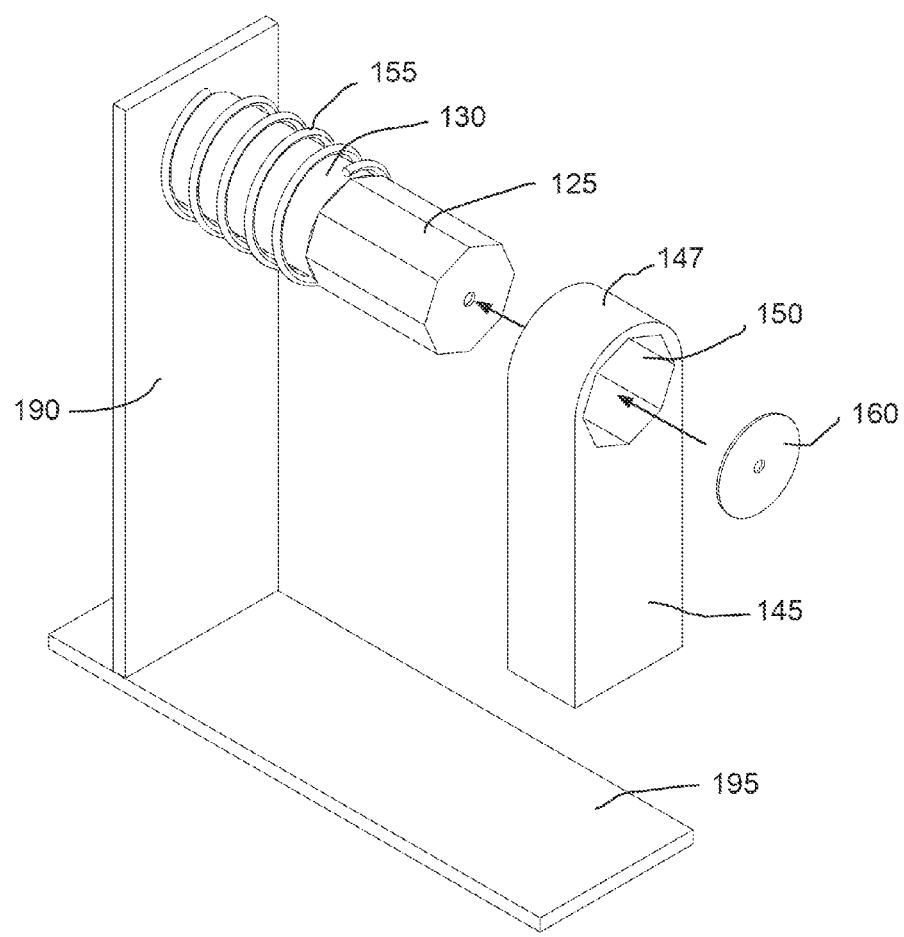
FIG. 7 illustrates how the initial position of a pivoting support element that is attached to a tube or hollow cylinder that incorporates a multi-sided cavity can be set on a matching cylindrical shaft with a biasing spring.

FIG. 7 illustrates how the initial position of a support element 145 that is attached to a tube or hollow cylinder 147 that incorporates a multi-sided cavity 150 can be set on a matching cylindrical shaft 130 with a biasing spring 155. The biasing spring may be a helical spring on a non-locking region of the shaft 130. The spring biases the support element 145 to the locking region 125 of the shaft 130. A stop disk 160 fixed to an end of the shaft 130 prevents the bias force of the spring from pushing the support element 145 off the end of the shaft. The bias force of the spring is overcome by a user sliding the support element from the locking region 125 to the non-locking region to allow the support element to pivot about the shaft to a desired angular position.

Figure 8A:
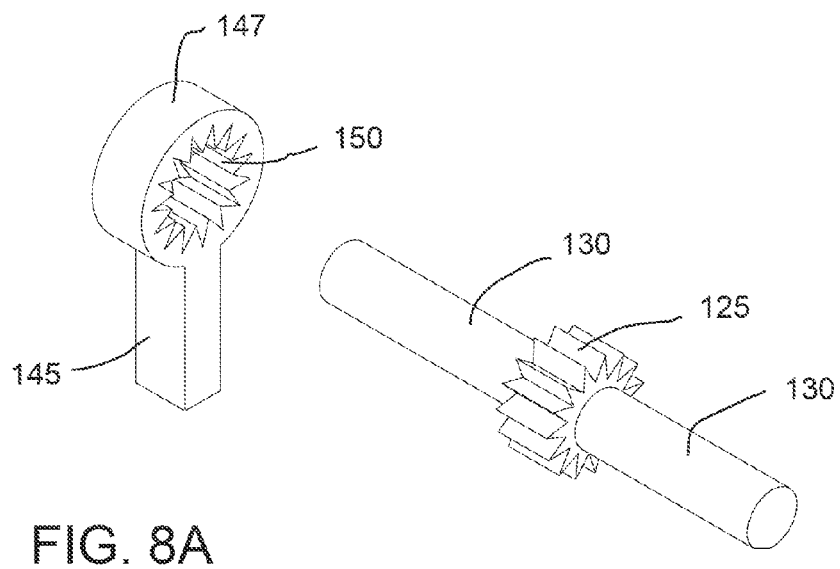
FIG. 8A illustrates a three dimensional perspective view of how a pivoting element attached to a tube or hollow cylinder that incorporate a toothed cavity can interlock with a matching toothed region located in the middle of the outer surface area of a matching cylindrical shaft.

FIG. 8A illustrates a three dimensional perspective view of how a pivoting element 145 attached to a tube or hollow cylinder 147 that incorporates a toothed cavity 150 can interlock with a matching toothed region 125 located in the middle of the outer surface area of a matching cylindrical shaft 130.

Figure 8B:
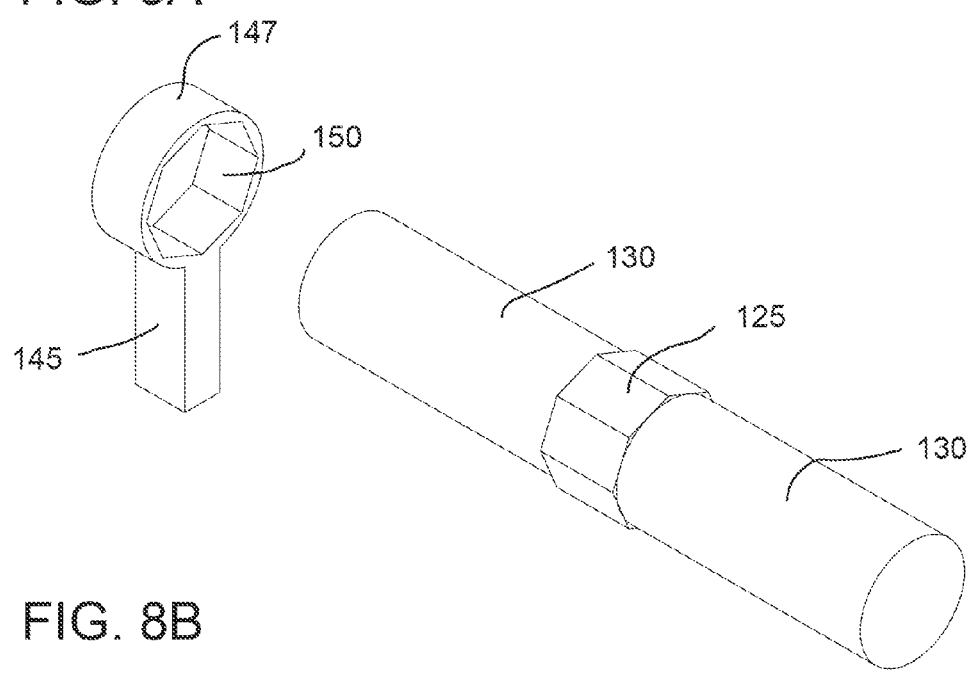
FIG. 8B illustrates a three dimensional perspective view of how a pivoting element attached to a tube or hollow cylinder that incorporate a multi-sided cavity can interlock with a matching multi-sided region located in the middle of the outer surface area of a matching cylindrical shaft.

FIG. 8B illustrates a three dimensional perspective view of how a pivoting element 145 attached to a tube or hollow cylinder 147 that incorporates a multi-sided cavity 150 can interlock with a matching multi-sided region 125 located in the middle of the outer surface area of a matching cylindrical shaft 125.

FIGS. 8A and 8B represent alternative embodiments of the concept of this invention where the locking of the rotation of the pivoting element can be achieved anywhere across the length of the cylindrical shaft and not necessarily at either end of the cylindrical shaft.

Figure 9A:
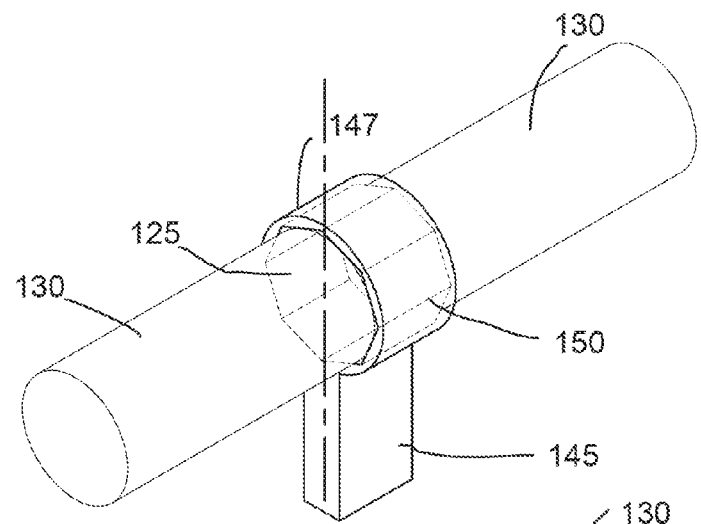
FIG. 9A illustrates a three dimensional perspective view of how when the multi-sided locking area of the cavity of a tube or hollow cylinder that is attached to a pivoting element comes in contact with a multi-sided or toothed locking region on the outer surface of a cylindrical shaft, the meshing areas interlock and the tube or hollow cylinder and the pivoting element to which it is attached can no longer pivot around the cylindrical shaft.

FIG. 9A illustrates a three dimensional perspective view of how when the multi-sided locking area of the cavity 150 of a tube or hollow cylinder 147 that is attached to a pivoting element 145 comes in contact with a multi-sided or toothed locking region 125 on the outer surface of a cylindrical shaft 130, the meshing areas interlock and the tube or hollow cylinder 147 and the pivoting element to which it is attached 145 can no longer pivot around the cylindrical shaft 130.

Figure 9B:
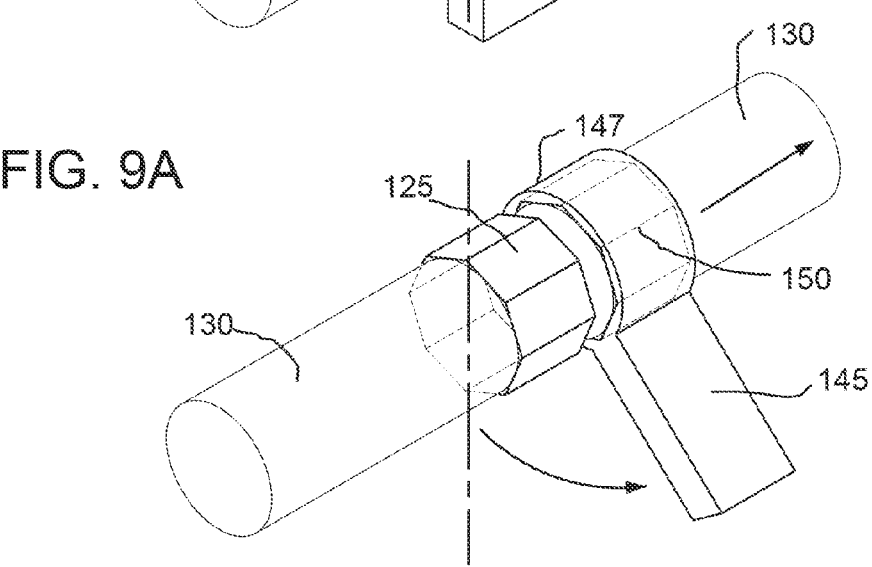
FIG. 9B illustrates how when the multi-sided locking area of the cavity of a tube or hollow cylinder that is attached to a pivoting element is thrust in a direction that results in the complete disengagement of the radially locking multi-sided or toothed area that is on the inner surface of the tube or hollow cylinder and a multi-sided or toothed locking region that is located on the cylindrical shaft, the tube or hollow cylinder and its attached support element become free to pivot and rotate to a new angular position around the cylindrical shaft.

FIG. 9B illustrates how when the multi-sided locking area of the cavity 150 of a tube or hollow cylinder 147 that is attached to a pivoting element 145 is thrust in a direction that results in the complete disengagement of the radially locking multi-sided or toothed area that is on the inner surface of the tube or hollow cylinder 150 and a multi-sided or toothed locking region 125 that is located on the surface of the cylindrical shaft 130, the tube or hollow cylinder 147 and its attached support element 145 become free to pivot and rotate to a new angular position around cylindrical shaft 130.

Figure 9C:
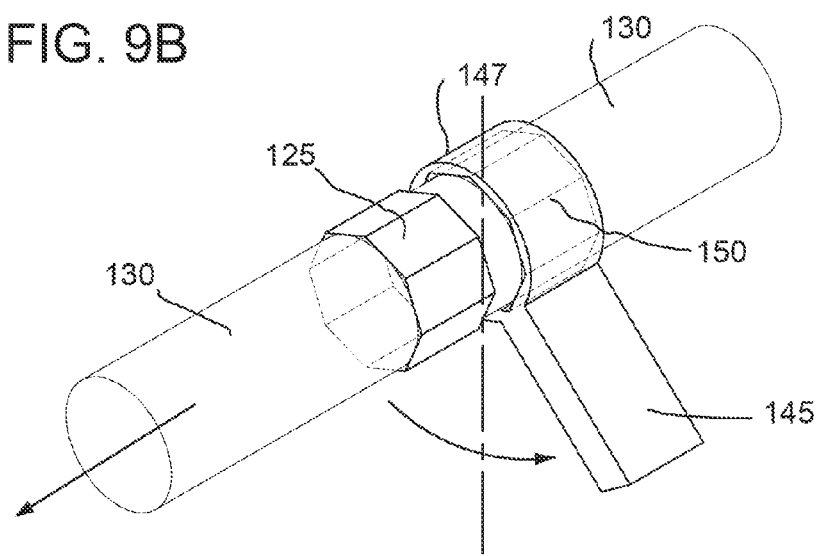
FIG. 9C illustrates how constricting the tube or hollow cylinder that is attached to the support element from moving in a lateral direction, and thrusting the cylindrical shaft in a lateral direction that would result in the total disengagement of the matching multi-sided or toothed locking areas that are located on the inner surface of the tube or hollow cylinder and the outer surface of the cylindrical shaft would also free the tube or hollow cylinder and its attached support element to pivot and rotate to a new angular position around the cylindrical shaft.

FIG. 9C illustrates how constricting the tube or hollow cylinder 147 that is attached to the support element 145 from moving in a lateral direction, and thrusting the cylindrical shaft 130 in a lateral direction that would result in the total disengagement of the matching multi-sided or toothed locking areas (125 and 150) that are located on the inner surface of the tube or hollow cylinder 150 and the outer surface of cylindrical shaft 130 would also free the tube or hollow cylinder 147 and its attached support element 145 to pivot and rotate to a new angular position around cylindrical shaft 130.

Figure 10:
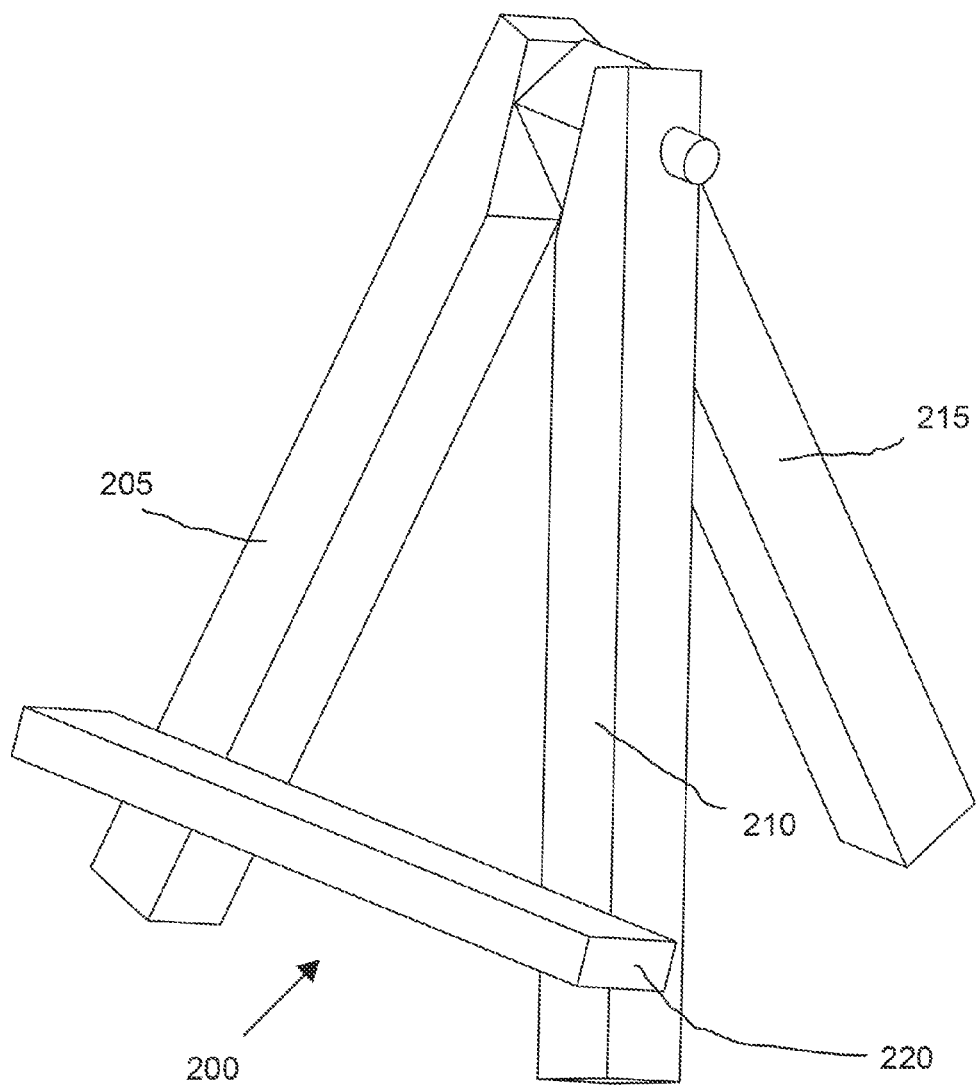
FIG. 10 illustrates a three-dimensional perspective view of a tripod. The tripod illustration is provided to show how extending a thin support element from the flat surface of a smart phone can provide stable angular support for the smart phone.

FIG. 10 illustrates a three-dimensional perspective view of a tripod 200. The tripod illustration is provided as an exemplary embodiment of how extending a relatively thin support element (exemplified by leg 215) from the flat surface of a plate (exemplified by the planar area that is bound by legs 205 and 210 and cross bar 220) can provide stable angular support for that plate. Similarly, extending a thin support element from the middle of the back surface of a smart phone or a tablet can be sufficient to provide stable angular support for that smart phone or tablet.

FIGS. 11A to 14A and FIGS. 11B to 14B together are a sequence of drawings that when displayed one after another provide a flip chart animation showing how an tube or hollow cylinder 347 attached to a support element 345 can be slid across a horizontal cylindrical shaft 330 with a multi-sided locking region 325 located at one edge of the cylindrical shaft 330 to unlock, rotate, and relock the support element 345 positioned in the middle of the back surface 305 of a smart phone in order to provide robust angular support for that smart phone at multiple inclined positions.

FIGS. 11A and 11B illustrate a pivoting support element 345 that is attached to a tube or hollow cylinder 347 and situated in a planar structure 310 secured by four pins 315A, 315B, 315C, 315D to the back plate 305 of a smart phone, or smart phone cover, in an initial locked position with its multi-sided cavity 350 meshed (locked) radially with locking region 325 of cylindrical shaft 330.

FIGS. 12A and 12B illustrate pivoting support element 345 that is attached to tube or hollow cylinder 347 having moved to an unlocked position with its multi-sided cavity 350 disengaged (unlocked) from locking region 325 of cylindrical shaft 330.

Figures 13A, 13B:
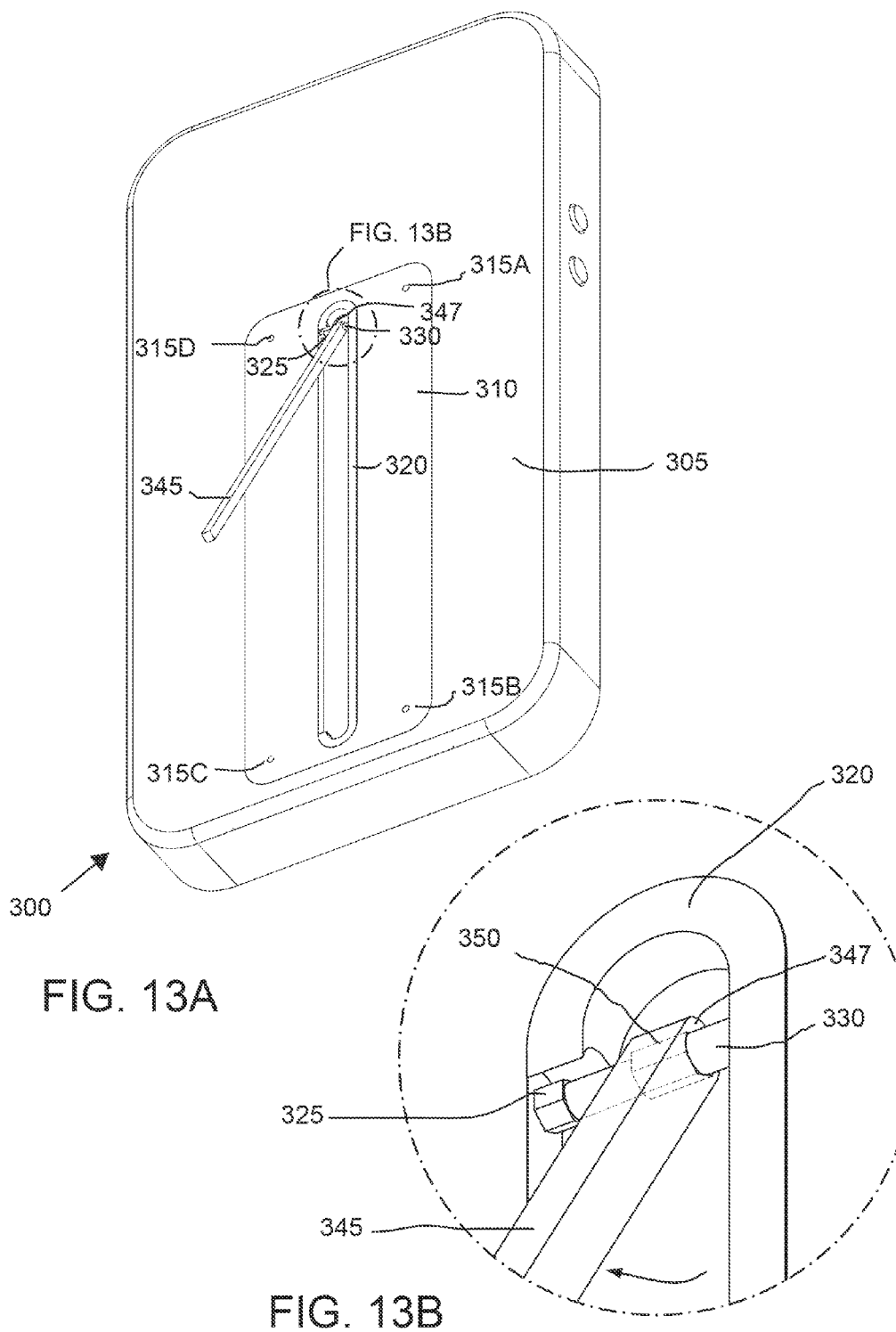

FIGS. 13A and 13B illustrate pivoting support element 345 that is attached to tube or hollow cylinder 347 pivoting to a new angular position with its multi-sided cavity 350 disengaged (unlocked) from locking region 325 of cylindrical shaft 330.

Figures 14A, 14B:
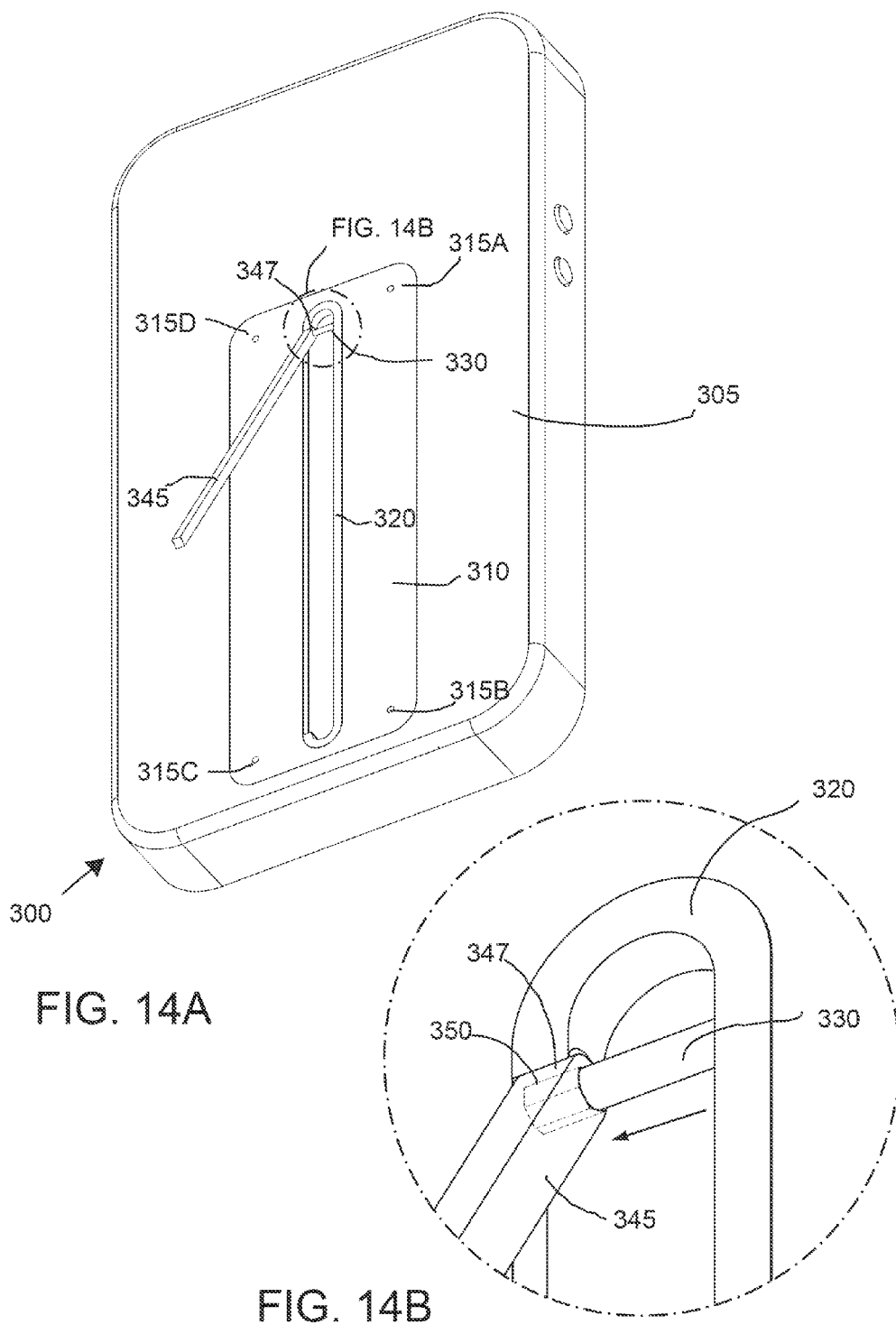

FIGS. 14A and 14B illustrate the newly fixed angular position of pivoting support element 345 that is attached to tube or hollow cylinder 347 after having slid back into the locked position subsequent to having pivoted to a new angular position while its multi-sided cavity 350 was fully disengaged from locking region 325 of cylindrical shaft 330.

Figure 15:
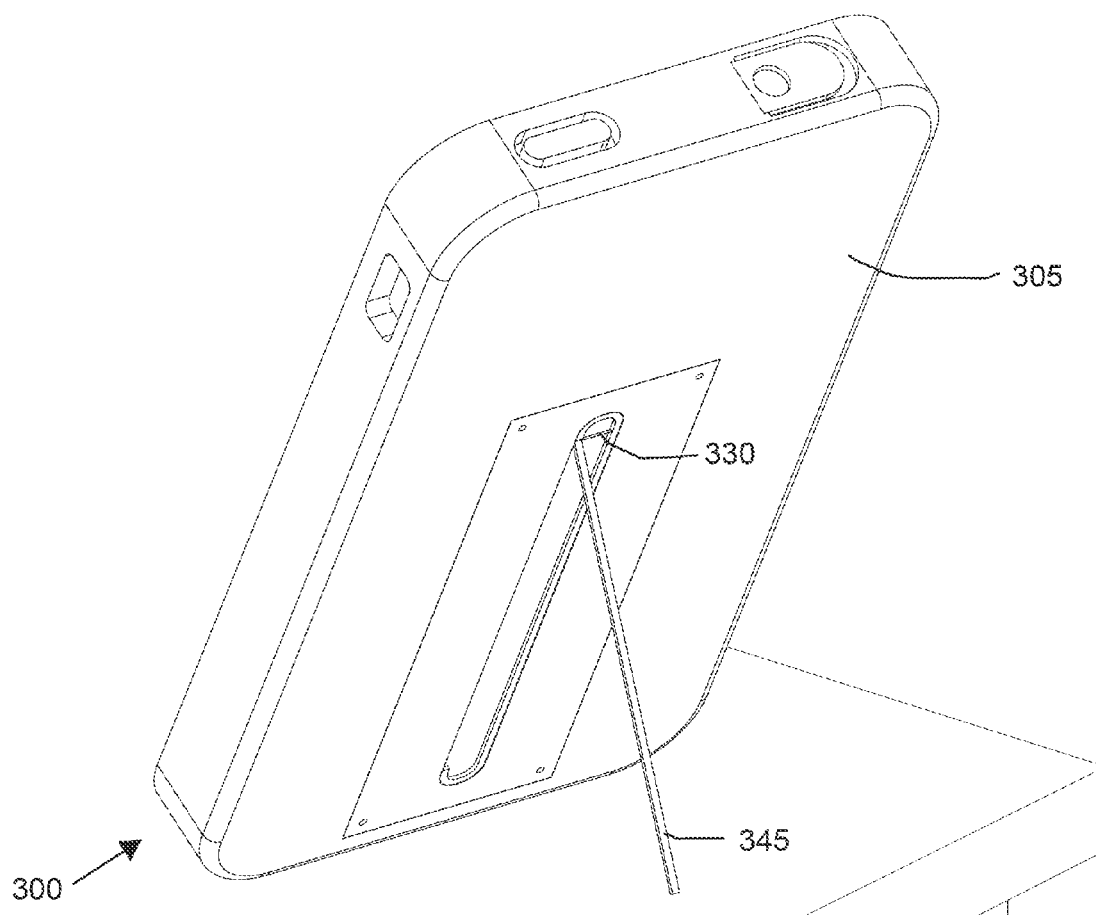
FIG. 15 illustrates a three dimensional perspective view of the back of a smart phone resting on the flat surface of a table with its support element deployed at an inclined position in the portrait orientation.

FIG. 15 illustrates a three dimensional perspective view of the back of a smart phone 300 resting on a table 400 with its support element 345 deployed at an inclined position in the portrait orientation.

Figure 16:
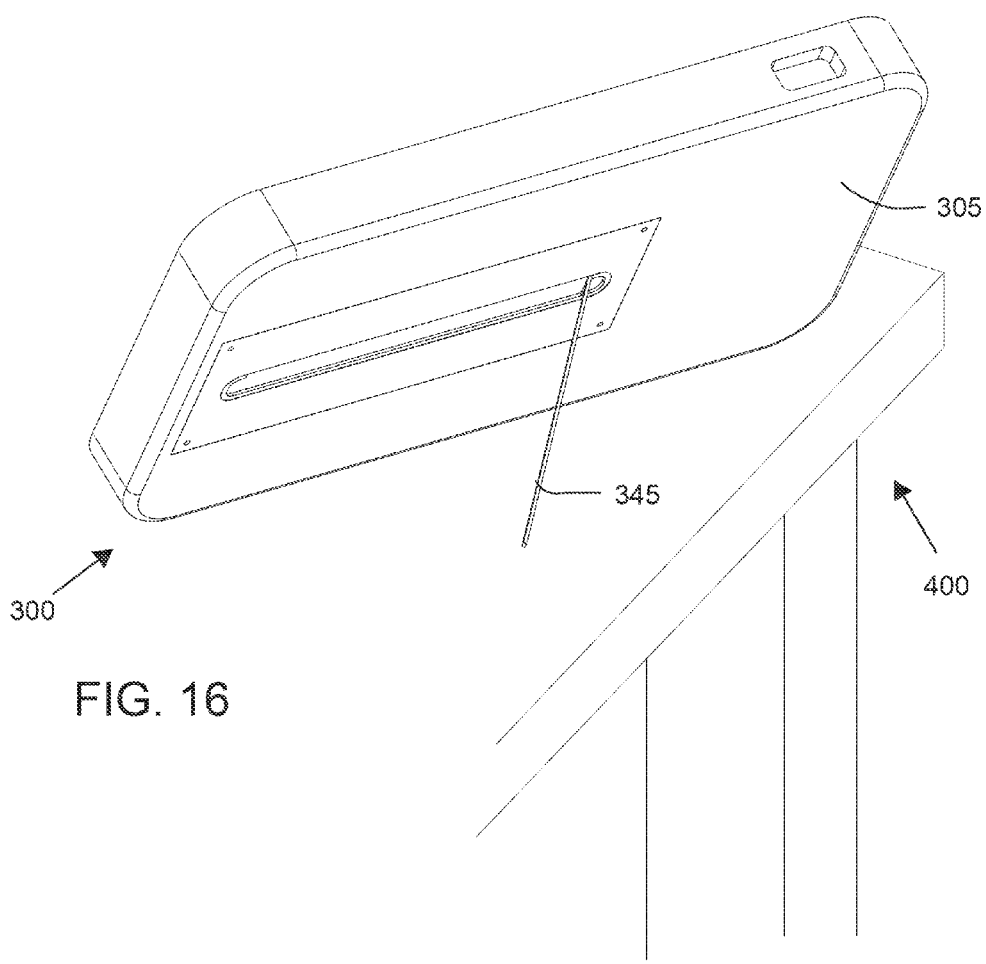
FIG. 16 illustrates a three dimensional perspective view of the back of a smart phone resting on the flat surface of a table with its support element deployed at an inclined position in the landscape orientation.

FIG. 16 illustrates a three dimensional perspective view of the back of a smart phone 300 resting on a table 400 with its support element 345 deployed at an inclined position in the landscape orientation.

FIGS. 17A to 20A and FIGS. 17B to 20B and FIGS. 17C to 20C together are a sequence of drawings that when displayed one after another provide a flip chart animation showing how an rotationally fixed cylindrical shaft 365 that is positioned in a tube or hollow cylinder 370 which is attached to the back panel 305 of a smart phone or smart phone cover 300 can be thrust laterally across the tube or hollow cylinder to unlock, rotate, and relock a transverse pivoting support element 345 which can be used to provide stable angular support for the smart phone 300 at multiple inclined positions.

FIGS. 17A, 17B, and 17C together illustrate a pivoting support element 345 seated in a recess 380 in the back panel 305 of a smart phone 300 or a smart phone cover. The pivoting support element 345 being disposed in the flush position within the surface 305 of the back panel and is laterally traversed by a cylindrical shaft 365 seated in a hollow cylinder 370 that is also imbedded in the back panel 305 of smart phone 300.

The pivoting support element 345 is attached to a tube or hollow cylinder 347 whose cavity includes at least one multi-sided or toothed locking area 350 that is configured to radially mesh and interlock with a multi-sided or toothed locking region 325 of cylindrical shaft 365 around which it rotates and is set to a default locked position which aligns it neatly in the flush position relative to the surface of the back plate 305 of smart phone 300, with its multi-sided cavity 350 meshed (locked) radially with locking region 325 of cylindrical shaft 365.

Cylindrical shaft 365 incorporates at least one multi-sided or toothed locking region 325 that is configured to radially mesh and interlock with the multi-sided or toothed locking area 350 of tube or hollow cylinder 347 into which cylindrical shaft 365 traverses and that is attached to pivoting support element 345. The cylindrical shaft 365 may be orthogonal, e.g., at ninety degrees, with respect to the support element 345.

Cylindrical shaft 365 may also incorporate another multi-sided or toothed locking area 355 along its length that will continuously mesh and interlock with a corresponding multi-sided or toothed locking area 375 in the cavity of the hollow cylinder 370 into which it slides in order to continuously restrict cylindrical shaft 365 from pivoting around its axis and to limit its displacement to lateral movement only.

A cap 390 that forms a push-button may be placed at one end of cylindrical shaft 365, and a spring 395 at the other in order to enable a user to thrust the shaft laterally along its axis to displace the multi-sided or toothed locking region 325 of cylindrical shaft 365 out of its meshing zone with a corresponding multi-sided or toothed locking area 350 inside the cavity of tube or hollow cylinder 347 that is attached to pivoting support element 345 and allow the support element 345 to pivot around its axis.

The spring 395 is used to return cylindrical shaft 365 to a default lateral position that will re-mesh the multi-sided or toothed locking region 325 of cylindrical shaft 365 with a corresponding multi-sided or toothed locking area 350 inside the cavity of tube or hollow cylinder 347 that is attached to the pivoting support element 345 as soon as the user releases push-button 390 that is at the other end of the shaft, thereby freezing the angular position of pivoting support element 345 with respect to cylindrical shaft 365 at the time their respective multi-sided or toothed locking regions (325 and 350) re-engage and mesh (lock) with each other and setting the back panel 305 of the smart phone 300 to a new inclined or retracted position.

FIGS. 18A, 18B, and 18C together illustrate push-button 390 having been pushed, and cylindrical shaft 365 having been thrust to an unlocked position, to the right, compressing spring 395, and disengaging (unlocking) the multi-sided or toothed locking regions (325 and 350) thereby freeing tube or hollow cylinder 347 and its attached pivoting support element 345 to pivot freely around cylindrical shaft 365.

Figures 19A, 19B, 19C:
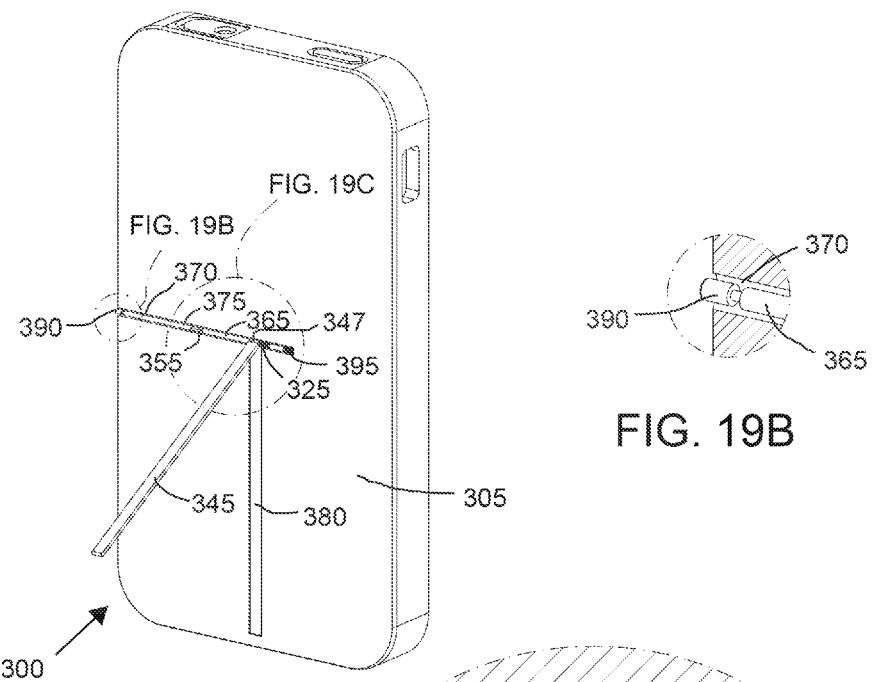

FIGS. 19A, 19B, and 19C together illustrate push-button 390 continuing to be pushed, and cylindrical shaft 365 continuing to be thrust into the unlocked position, allowing hollow cylinder 347 and its attached pivoting support element 345 to rotate to a new angular position around cylindrical shaft 365.

FIGS. 20A, 20B, and 20C together illustrate push-button 390 being released, and spring 395 decompressing and pushing cylindrical shaft 365 back into its default locked position; reengaging (locking) the multi-sided or toothed locking regions (325 and 350) and freezing tube or hollow cylinder 347 and its attached pivoting support element 345 in their new angular position with respect to cylindrical shaft 365; consequently enabling smart phone 300 to be set to a new inclined position.

Figure 21:
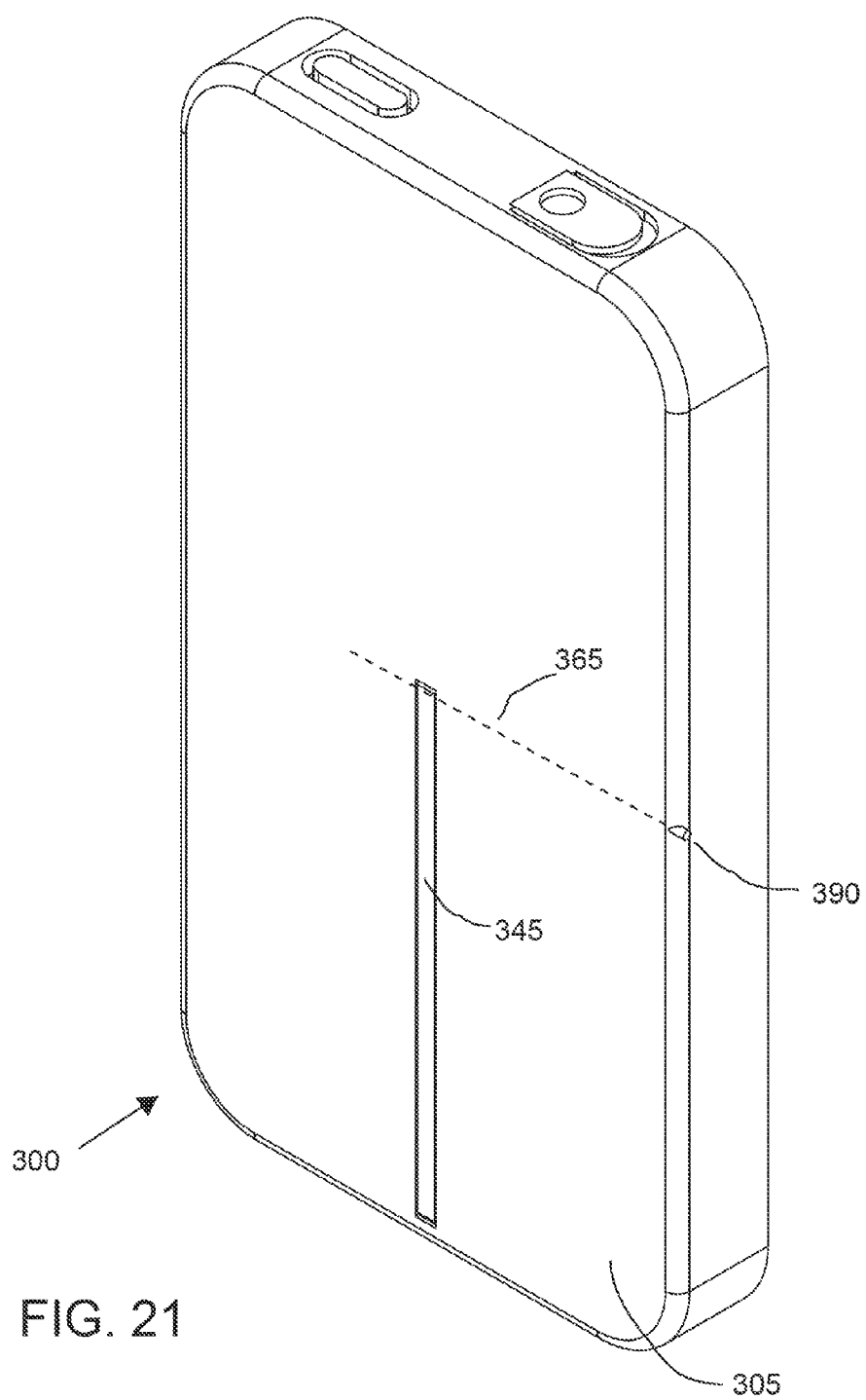
FIG. 21 provides a three-dimensional perspective view of a smart phone with the pivoting support element in the retracted flush position.

FIG. 21 illustrates a three dimensional perspective view of the back of a smart phone 300 with its cylindrical shaft 365 and push-button 390 positioned the right side of its back panel and its support element 345 in the retracted position.

Figure 22:
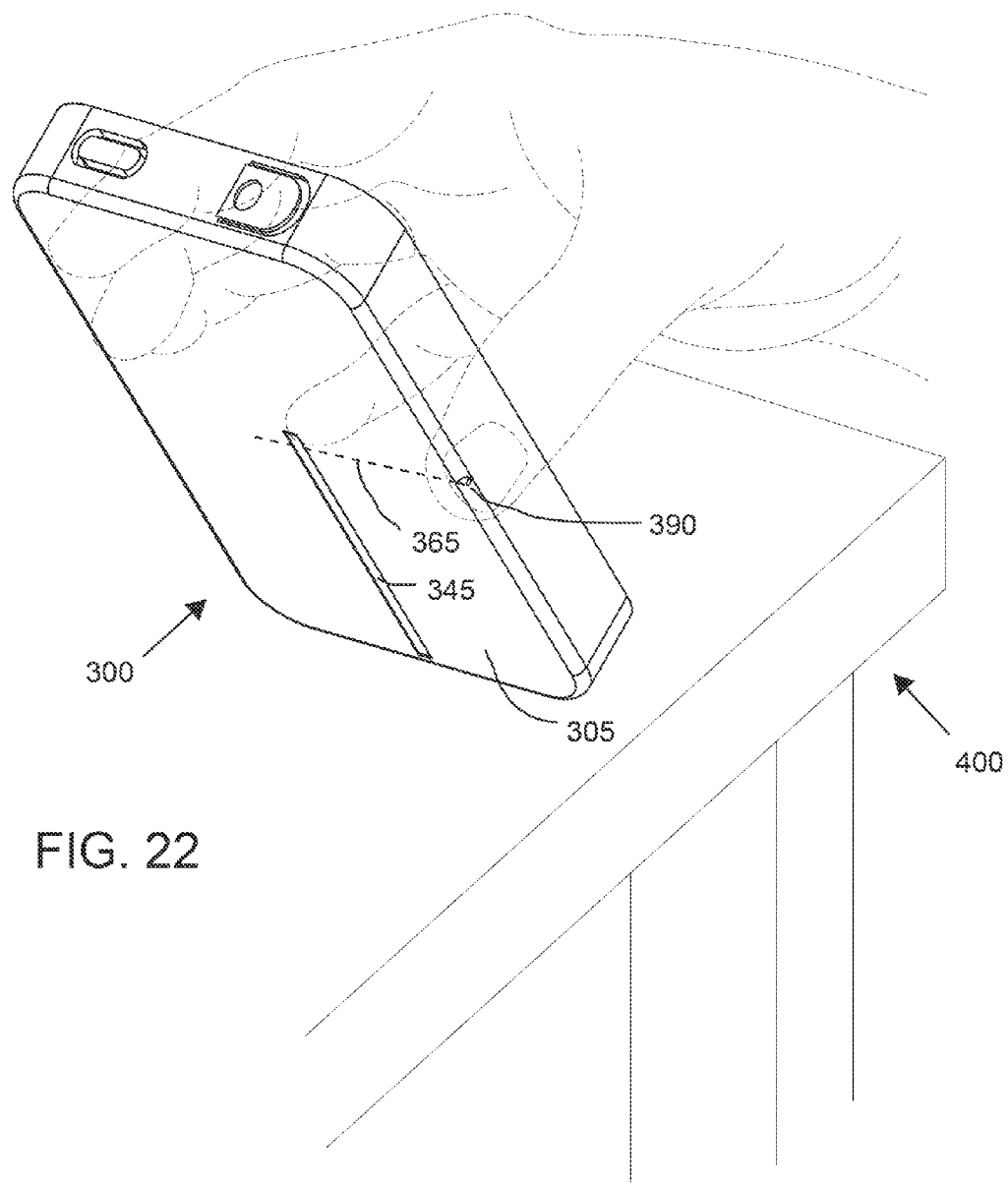
FIG. 22 provides a three-dimensional perspective view of a human hand pressing a button at the edge of a smart phone to deploy the pivoting support element into an inclined support position from its retracted flush position.

FIG. 22 provides a three-dimensional perspective view of a human hand pressing push-button 390 of smart phone 300 in order to deploy its pivoting support element 345 into an inclined position to support comfortable viewing on a table 400.

Figure 23:
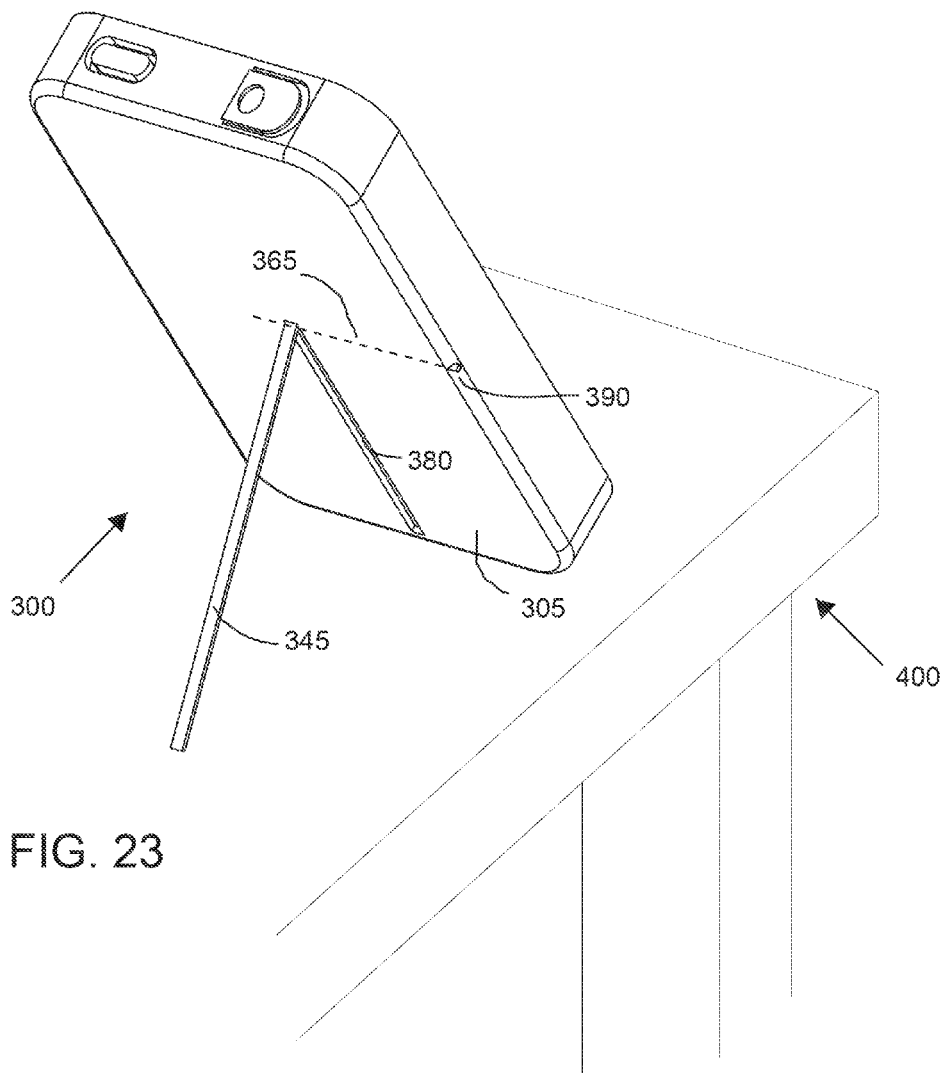
FIG. 23 illustrates a three dimensional perspective view of the back of a smart phone with the support element deployed at an inclined position in the portrait orientation.

FIG. 23 illustrates a three dimensional perspective view of the back of a smart phone 300 with its support element 345 deployed at an inclined position in the portrait orientation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

I have invented:

1. A first plate or arm including a slot;
   a second plate or arm seated in the slot of the first plate or arm and the second plate or arm comprising a middle cylindrical bore, and wherein the middle cylindrical bore and the second plate or arm that is connected to it are narrower than the width of the slot such that a gap is between a first side of the second plate or arm and a first side of the slot;
   the middle cylindrical bore comprising at least one locking region with faceted sides or teeth on an inner circumference of the cylindrical bore; and wherein the second plate or arm pivots axially relative to the plane of the first plate or arm;
   a shaft secured to the first plate or arm, bridging the slot and extending through the middle cylindrical bore, the shaft comprising at least one locking region with faceted sides or teeth on an outer circumference of the shaft and at least one non-locking region contiguous with the at least one locking region, wherein the at least one non-locking region is defined by a smooth cylindrical surface of the outer circumference of the shaft and around which the second plate or arm pivots axially;
   wherein the second plate or arm slides along the shaft between an unlocked position and a locked position, such that:
      while in the unlocked position the at least one multi-sided or toothed locking region of the middle cylindrical bore is aligned with the non-locking region of the shaft and completely disengaged from the at least one multi-sided or toothed locking region on the outer circumference of the shaft; and while in the unlocked position, the middle cylindrical bore and the second plate or arm that is connected to it are free to rotate relative to the first plate or arm; and while in the locked position the at least one multi-sided or toothed locking region of the middle cylindrical bore is aligned with and engages the at least one multi-sided or toothed locking region on the outer circumference of the shaft; and while in the locked position, the middle cylindrical bore and the second plate or arm that is connected to it are prevented from rotating relative to the first plate or arm and wherein while the second plate or arm is in the locked position the second plate or arm is configured to comprise an element of the first plate or arm which defines the slot or comprises a pivoted support element.

2. The hinge or clamp assembly of claim 1 wherein the at least one locking region of the middle cylindrical bore is a plurality of locking regions.

3. The hinge or clamp assembly of claim 1 wherein the at least one locking region of the shaft is a plurality of locking regions.

4. The hinge or clamp assembly of claim 1 wherein the cylindrical bore included with the second plate or arm is a plurality of cylindrical bores.

5. A housing or protective casing for an electronic device comprising:
a back wall including a slot;
a plate or arm seated in the slot of the back wall and the plate or arm comprising a middle cylindrical bore, and wherein the middle cylindrical bore and the plate or arm that is connected to it are narrower than the width of the slot such that a gap is between a first side of the plate or arm and a first side of the slot;
the middle cylindrical bore comprising at least one locking region with faceted sides or teeth on an inner circumference of the cylindrical bore; and wherein the plate or arm pivots axially relative to the plane of the back wall;
a shaft secured to the back wall, bridging the slot and extending through the middle cylindrical bore, the shaft comprising at least one locking region with faceted sides or teeth on an outer circumference of the shaft and at least one non-locking region contiguous with the at least one locking region, wherein the at least one non-locking region is defined by a smooth cylindrical surface of the outer circumference of the shaft and around which the second plate or arm pivots axially;
wherein the plate or arm slides along the shaft between an unlocked position and a locked position, such that:
while in the unlocked position the at least one multi-sided or toothed locking region of the middle cylindrical bore is aligned with the non-locking region of the shaft and completely disengaged from the at least one multi-sided or toothed locking region on the outer circumference of the shaft; and while in the unlocked position, the middle cylindrical bore and the plate or arm that is connected to it are free to rotate relative to the first plate or arm; and while in the locked position the at least one multi-sided or toothed locking region of the middle cylindrical bore is aligned with and engages the at least one multi-sided or toothed locking region on the outer circumference of the shaft; and while in the locked position, the middle cylindrical bore and the plate or arm that is connected to it are prevented from rotating relative to the back wall and wherein while the second plate or arm is in the locked position the second plate or arm is configured to comprise an element of the first plate or arm which defines the slot or comprises a pivoted support element.

6. The hinge assembly of claim 5 wherein the at least one locking region of the middle cylindrical bore is a plurality of locking regions.

7. The hinge assembly of claim 5 wherein the at least one locking region of the shaft is a plurality of locking regions.

8. The hinge or clamp assembly of claim 5 wherein the cylindrical bore included with the plate or arm is a plurality of cylindrical bores.

9. A hinge or clamp assembly comprising:
a first plate or arm including a slot and outer cylindrical bores on opposite sides of the slot, wherein the outer cylindrical bores are coaxial;
a second plate or arm seated in the slot of the first plate or arm and the second plate or arm comprising a middle cylindrical bore coaxial with the outer cylindrical bores, and
the middle cylindrical bore comprising at least one locking region with faceted sides or teeth on an inner circumference of the cylindrical bore and wherein the second plate or arm moves rotationally relative to the first plate or arm about a longitudinal axis defined by the outer and middle cylindrical bores;
a locking mechanism including a hinge shaft that is rotationally fixed and seated inside the outer and middle cylindrical bores, extends through the outer and middle cylindrical bores and is configured to move axially along the longitudinal axis of the middle and outer cylindrical bores, the shaft comprising at least one locking region with faceted sides or teeth on an outer circumference of the shaft and at least one non-locking region contiguous with the at least one locking region, wherein the at least one non-locking region is defined by a smooth cylindrical surface of the outer circumference of the shaft;
wherein the hinge shaft slides along the middle cylindrical bore between an unlocked position and a locked position, such that:
while the hinge shaft is in the unlocked position the at least one non-locking region of the hinge shaft is aligned with the at least one locking region of the middle cylindrical bore, and while the hinge shaft is in the unlocked position, the middle cylindrical bore and the second plate or arm that is connected to it are while the hinge shaft is in the locked position the at least one multi-sided or toothed locking region of the hinge shaft is partially or fully aligned with the at least one locking region of the middle cylindrical bore, and while the hinge shaft is in the locked position, the middle cylindrical bore and the second plate or arm that is connected to it are prevented from rotating relative to the outer cylindrical bores and the first plate or arm that is connected to them and wherein while the second plate or arm is in the locked position the second plate or arm is configured to comprise an element of the first plate or arm which defines the slot or comprises a pivoted support element; and
a biasing mechanism configured to urge the hinge shaft axially along the longitudinal axis of the bores in a direction to engage the at least one multi-sided or toothed locking area of the hinge shaft with the at least one multi-sided or toothed locking area of the middle cylindrical bore, thereby preventing the first plate or arm and the second plate or arm from pivoting relative to one another; and
a release post configured to be manually displaced to urge the hinge shaft axially along the longitudinal axis of the bores in a direction to disengage the at least one multi-sided or toothed locking region of the hinge shaft from the at least one multi-sided or toothed locking region of the middle cylindrical bore, thereby allowing the second plate or arm to pivot relative to the first plate or arm.

10. The hinge or clamp of claim 9 wherein the biasing mechanism is a spring.

11. The hinge or clamp of claim 9 wherein the biasing mechanism is a coil spring.

12. The hinge assembly of claim 9 wherein the at least one locking region of the middle cylindrical bore is a plurality of locking regions.

13. The hinge assembly of claim 9 wherein the at least one locking region of the shaft is a plurality of locking regions.

14. The hinge or clamp assembly of claim 9 wherein the cylindrical bore included with the second plate or arm is a plurality of cylindrical bores.

15. A casing for an electronic device comprising:
- a back wall including a slot and outer cylindrical bores on opposite sides of the slot, wherein the outer cylindrical bores are coaxial;
- a plate or arm seated in the slot the back wall and the plate or arm comprising a middle cylindrical bore coaxial with the outer cylindrical bores; and
- the middle cylindrical bore comprising at least one locking region with faceted sides or teeth on an inner circumference of the cylindrical bore and wherein the plate or arm moves rotationally relative to the back wall about a longitudinal axis defined by the outer and middle cylindrical bores;
- a locking mechanism including a hinge shaft that is rotationally fixed and seated inside the outer and middle cylindrical bores, extends through the outer and middle cylindrical bores and is configured to move axially along the longitudinal axis of the middle and outer cylindrical bores, the shaft comprising at least one locking region with faceted sides or teeth on an outer circumference of the shaft and at least one non-locking region contiguous with the at least one locking region, wherein the at least one non-locking region is defined by a smooth cylindrical surface of the outer circumference of the shaft;
- wherein the hinge shaft slides along the middle cylindrical bore between an unlocked position and a locked position, such that:
  - while the hinge shaft is in the unlocked position the at least one non-locking region of the hinge shaft is aligned with the at least one locking region of the middle cylindrical bore, and while the hinge shaft is in the unlocked position, the middle cylindrical bore and the second plate or arm that is connected to it are free to rotate relative to the outer cylindrical bores of the first plate or arm that is connected to them, and while the hinge shaft is in the locked position the at least one multi-sided or toothed locking region of the hinge shaft is partially or fully aligned with the at least one locking region of the middle cylindrical bore, and while the hinge shaft is in the locked position, the middle cylindrical bore and the second plate or arm that is connected to it are prevented from rotating relative to the outer cylindrical bores and the first plate or arm that is connected to them and wherein while the second plate or arm is in the locked position the second plate or arm is configured to comprise an element of the first plate or arm which defines the slot or comprises a pivoted support element; and
- a biasing mechanism configured to urge the hinge shaft axially along the longitudinal axis of the bores in a direction to engage the at least one multi-sided or toothed locking area of the hinge shaft with the at least one multi-sided or toothed locking area of the middle cylindrical
- a release post configured to be manually displaced to urge the hinge shaft axially along the longitudinal axis of the bores in a direction to disengage the at least one multi-sided or toothed locking region of the hinge shaft from the at least one multi-sided or toothed locking region of the middle cylindrical bore, thereby allowing the second plate or arm to pivot relative to the first plate or arm.

16. The hinge assembly of claim 15 wherein the at least one locking region of the middle cylindrical bore is a plurality of locking regions.

17. The hinge or clamp of claim 16 wherein the biasing mechanism is a coil spring.

18. The hinge or clamp of claim 16 wherein the biasing mechanism is a spring.

19. The hinge assembly of claim 15 wherein the at least one locking region of the shaft is a plurality of locking regions.

20. The hinge assembly of claim 15 wherein the cylindrical bore included with the plate or arm is a plurality of cylindrical bores.

* * * * *

UNITED STATES PATENT AND TRADEMARK OFFICE
CERTIFICATE OF CORRECTION

PATENT NO. : 9,933,009 B1
APPLICATION NO. : 14/952595
DATED : April 3, 2018
INVENTOR(S) : Joseph Zaloom Page 1 of 2

It is certified that error appears in the above-identified patent and that said Letters Patent is hereby corrected as shown below:

In the Claims

Claim 1: THE WORDS "or comprises a pivoted support element." AT THE END OF Claim 1; Column 12, Line 60 MUST BE DELETED.

Claim 5: THE WORDS "or comprises a pivoted support element." AT THE END OF Claim 5; Column 13, Lines 48 and 49 MUST BE DELETED.

Claim 9: ADD THE FOLLOWING MISSING TEXT:
"free to rotate relative to the outer cylindrical bores of the first plate or arm that is connected to them; and" AT Column 14, Line 26 -- right after the statement: "and the second plate or arm that is connected to it are" AT Column 14, Line 25.

Claim 9: THE WORDS "or comprises a pivoted support element." AT THE END OF PARAGRAPH 5; Column 14, Line 38 MUST BE DELETED.

Claim 15: ADD THE MISSING WORD "of" THAT IS BETWEEN BRACKETS IN THE STATEMENT BELOW AT Column 15; Line 5:
"a plate or arm seated in the slot" [of] "the back wall and the plate or arm comprising a middle cylindrical bore coaxial with the outer cylindrical bores; and".

Claim 15: THE WORDS "or comprises a pivoted support element." AT THE END OF PARAGRAPH 5; Column 16, Line 10 MUST BE DELETED.

Claim 15: ADD THE FOLLOWING MISSING TEXT AT PARAGRAPH 6; Column 16, Line 17:
"bore, thereby preventing the first plate or arm and the second plate or arm from pivoting relative to one another; and".

Signed and Sealed this
Twenty-sixth Day of February, 2019

Andrei Iancu
*Director of the United States Patent and Trademark Office*

CERTIFICATE OF CORRECTION (continued)
U.S. Pat. No. 9,933,009 B1

THE WRONG TEXT WAS ENTERED IN Claim 16; Column 16, Lines 26-28: PLEASE DELETE Claim 16 IN ITS ENTIRETY AND REPLACE WITH THE FOLLOWING TEXT:
"16. The hinge or clamp of claim 15 wherein the biasing mechanism is a spring.".

THE WRONG TEXT WAS ENTERED IN Claim 17; Column 16, Lines 29-30: PLEASE DELETE Claim 17 IN ITS ENTIRETY AND REPLACE WITH THE FOLLOWING TEXT:
"17. The hinge or clamp of claim 15 wherein the biasing mechanism is a coil spring.".

THE WRONG TEXT WAS ENTERED IN Claim 18; Column 16, Lines 31-32: DELETE Claim 18 IN ITS ENTIRETY AND REPLACE WITH THE FOLLOWING TEXT:
"18. The hinge assembly of claim 15 wherein the at least one locking region of the middle cylindrical bore is a plurality of locking regions.".